(12) United States Patent
Nakao et al.

(10) Patent No.: US 7,815,217 B2
(45) Date of Patent: Oct. 19, 2010

(54) INTERIOR STRUCTURE OF VEHICLE EQUIPPED WITH CURTAIN AIRBAG

(75) Inventors: Hiroaki Nakao, Hiroshima (JP); Motoharu Hirata, Hiroshima (JP)

(73) Assignee: Mazda Motor Corporation (JP)

( * ) Notice: Subject to any disclaimer, the term of this patent is extended or adjusted under 35 U.S.C. 154(b) by 460 days.

(21) Appl. No.: 11/892,828

(22) Filed: Aug. 28, 2007

(65) Prior Publication Data

US 2008/0073889 A1    Mar. 27, 2008

(30) Foreign Application Priority Data

Sep. 26, 2006  (JP) .............................. 2006-260454
Sep. 26, 2006  (JP) .............................. 2006-261242

(51) Int. Cl.
    *B60R 21/21*    (2006.01)
(52) U.S. Cl. .................................... 280/730.2; 280/808
(58) Field of Classification Search .............. 280/730.2, 280/801.1, 808; 296/1.08
    See application file for complete search history.

(56) References Cited

U.S. PATENT DOCUMENTS

| | | | | |
|---|---|---|---|---|
| 5,762,371 A | * | 6/1998 | Noguchi ................... | 280/801.2 |
| 5,899,491 A | * | 5/1999 | Tschaeschke ............ | 280/730.2 |
| 6,129,377 A | * | 10/2000 | Okumura et al. ......... | 280/730.2 |
| 6,155,596 A | * | 12/2000 | Nakajima et al. ......... | 280/730.2 |
| 6,336,662 B1 | * | 1/2002 | Kurita et al. ............. | 280/801.1 |
| 6,361,069 B1 | * | 3/2002 | Saito et al. ................ | 280/730.2 |
| 6,371,512 B1 | * | 4/2002 | Asano et al. ............. | 280/730.2 |
| 6,644,687 B2 | * | 11/2003 | Saito et al. ................ | 280/730.2 |
| 7,134,682 B2 | * | 11/2006 | Totsuka et al. ........... | 280/728.2 |
| 7,198,300 B2 | * | 4/2007 | Daume et al. ............ | 280/801.2 |
| 7,445,233 B2 | * | 11/2008 | McKimson ............... | 280/730.2 |
| 2004/0041376 A1 | * | 3/2004 | Winkler ................... | 280/730.2 |
| 2004/0150198 A1 | * | 8/2004 | Totsuka et al. ........... | 280/730.2 |

FOREIGN PATENT DOCUMENTS

GB    2 367 040 A    3/2002
JP    2006143215    6/2008

OTHER PUBLICATIONS

Partial European Search Report issued on Jan. 16, 2008 for the European Patent Application No. 07 018 382.7.

* cited by examiner

*Primary Examiner*—Faye M. Fleming
*Assistant Examiner*—Timothy D Wilhelm
(74) *Attorney, Agent, or Firm*—Studebaker & Brackett PC; Donald R. Studebaker

(57) ABSTRACT

There is provided a slant face at an upper portion of a seatbelt anchor. The slant face is formed in such a manner that its lower portion is located inward. There is provided an uneven portion that is formed near an upper edge portion of the seatbelt anchor so as to overhang. Accordingly, the curtain airbag can be prevented from catching on the seatbelt anchor even if the curtain airbag inflates downward contacting the inner face of the center pillar during its inflation.

14 Claims, 25 Drawing Sheets

FIG. 4
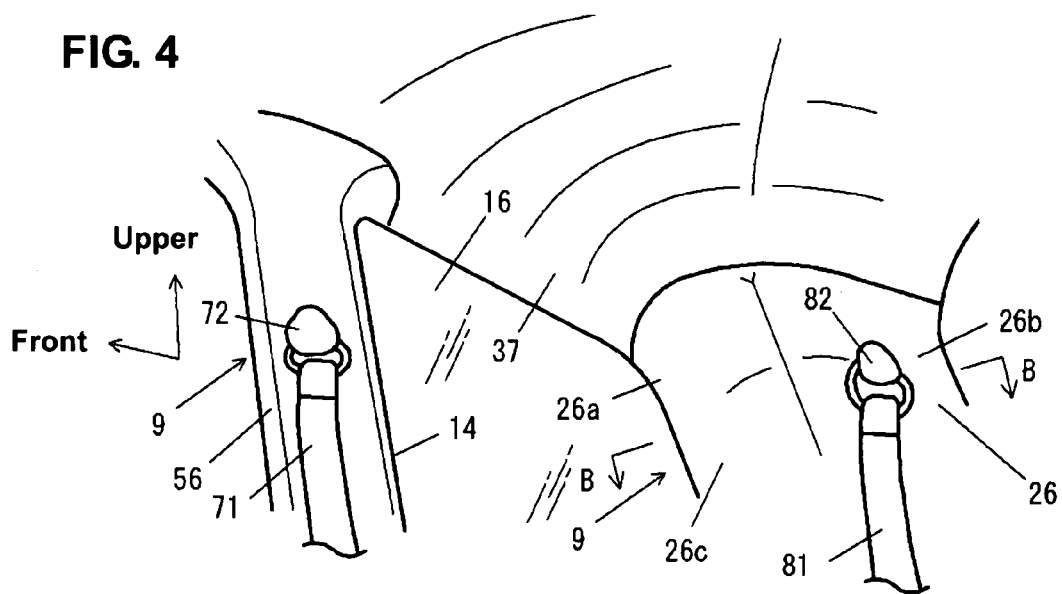
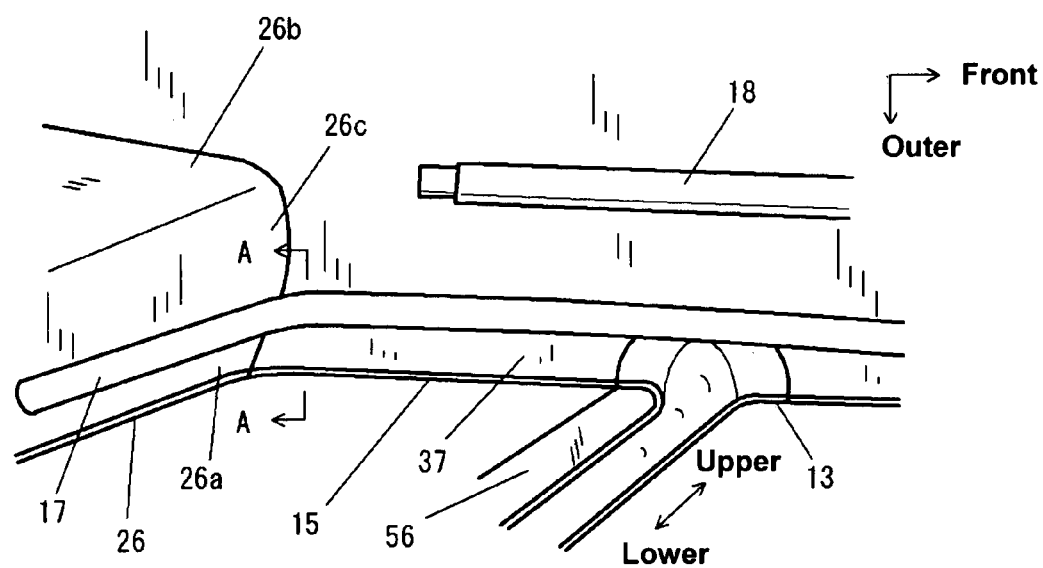
FIG. 5

INTERIOR STRUCTURE OF VEHICLE EQUIPPED WITH CURTAIN AIRBAG

BACKGROUND OF THE INVENTION

The present invention relates to an interior structure of a vehicle equipped with a curtain airbag.

Automotive vehicles are generally equipped with an airbag device to protect a passenger against a vehicle crash, turnover or the like. A curtain bag is known as an airbag of the airbag device, which inflates longitudinally so as to cover an inner face of a side window portion that comprises plural side window glasses, pillars and so on.

A seatbelt anchor may be provided at the inner face of the pillar to be covered by the curtain airbag. For example, U.S. Pat. No. 6,361,069 B1 discloses a structure in which the seatbelt anchor is provided so as to project inside from the center pillar trim that forms the inner face of the center pillar. Herein, the projecting potion (inflation-direction regulator portion) is provided at a specified portion of the center pillar trim above the seatbelt anchor, which restrains the curtain airbag inflating from catching on the seatbelt anchor.

US Patent Application Publication No. 2004/0150198 A1, meanwhile, discloses a structure in which the curtain airbag is provided inside not only the ceiling but the rear pillar. Herein, the curtain airbag is configured to inflate out of the gap between the front edge portion of the rear pillar trim and the side window glass, which is generated by pressing the front edge portion of the rear pillar inward by the curtain airbag.

The rear pillar trim is generally made of synthetic resin that is harder than a material of the roof trim that forms an inner face of the ceiling. This is because the rear pillar trim may not be hurt improperly by a loaded baggage or the like.

In the meantime, it is preferable that the curtain airbag be configured to provide a tension that extends longitudinally when its inflation is complete, for example, in order to improve the passenger's protection at the vehicle turnover or the like. Also, it may be considered that inflatable gas is supplied to the curtain airbag from a specified location in front of the center pillar in order to secure the proper protection of passengers seated in the front seats.

Herein, in a case where the seatbelt anchor is provided at the inner face of the center pillar as described above and the curtain airbag is provided to inflate out of the gap between the rear pillar trim and the side window glass as disclosed in the latter patent publication, the provision of the tension extending longitudinally may cause the following problem. Namely, while the above-described gap is located outward from the inner face of the center pillar in a general vehicle structure, the curtain airbag inflates downward contacting the inner face of the center pillar when the inflatable gas is supplied to the curtain airbag from the specified location in front of the center pillar (see FIG. 15). Accordingly, there is a concern that the curtain airbag may catch on the seatbelt anchor during its inflation.

The above-described patent publications do not disclose any this problem and its solutions.

SUMMARY OF THE INVENTION

The present invention has been devised in view of the above-described problem, and an object of the present invention is to provide an interior structure of a vehicle equipped with a curtain airbag that can properly prevent the curtain airbag from catching on the seatbelt anchor even if the curtain airbag inflates downward contacting the inner face of the center pillar during its inflation.

According to the present invention, there is provided an interior structure of a vehicle equipped with a curtain airbag, comprising a roof trim forming a ceiling, a rear pillar trim forming an inner face of a rear pillar that is located at a rear portion of the vehicle, the rear pillar trim being made of synthetic resin that is harder than a material making the roof trim, a seatbelt anchor provided at an inner face of a center pillar of the vehicle that is located in front of the rear pillar, the seatbelt anchor projecting inside of the vehicle, and a curtain airbag provided inside a side edge portion of the roof trim and the rear pillar trim along at least from an upper front portion of the center pillar to a lower portion of the rear pillar, the curtain airbag being configured to inflate covering at least an inner face of a side window portion of the vehicle that is located in front of a front edge portion of the rear pillar including the center pillar, when inflatable gas is supplied thereto under a specified condition, wherein the curtain airbag is configured to inflate substantially contacting the inner face of the center pillar, and there is provided a restraint structure operative to restrain the curtain airbag inflating from catching on the seatbelt anchor. Thereby, the lower end of the curtain airbag can be properly restrained from catching on the seatbelt anchor when it comes to contact an upper end portion of the seatbelt anchor, so that the proper inflation of the curtain airbag can be obtained.

According to an embodiment of the present invention, there is provided a slant face at an upper portion of the seatbelt anchor, the slant face being formed in such a manner that a lower portion thereof is located inward. The above-described restraint of the curtain airbag from catching can be properly attained by the slant face provided at the upper portion of the seatbelt anchor.

According to another embodiment of the present invention, the seatbelt anchor is provided at the inner face of the center pillar so as to rotate around an axis that extends substantially in a vehicle width direction, and the slant face is provided at the upper portion of the seatbelt anchor in such a manner that a clear rearview from a deriver's seat is not substantially deteriorated by the seatbelt anchor rotating by a specified rotational angle for application of a seatbelt to a passenger. Thereby, in addition to the above-described effect of the present invention, a properly clear rearview from the driver's seat can be obtained.

According to another embodiment of the present invention, the center pillar comprises a center pillar body and a center pillar trim that covers the center pillar body and form an inner face of the center pillar, the center pillar is formed in such a manner that a central portion thereof projects toward inside of the vehicle, and a gap in a vehicle width direction between an inner face of the center pillar trim and a face of the seatbelt anchor that faces the inner face of the center pillar trim when the seatbelt anchor rotates due to the application of the seatbelt is configured not to become larger than the gap at the time of an non-application of the seatbelt. Thereby, since the above-described gap is kept small when the seatbelt is applied for the passenger, the likelihood of the curtain bag getting into this gap can be reduced as much as possible.

According to another embodiment of the present invention, the curtain airbag is configured in such a manner that the inflatable gas is supplied thereto from a specified location in front of the center pillar, the seatbelt anchor is configured such that an incline of the upper portion thereof is gentler than that of a front portion thereof, the seatbelt anchor is provided so as to rotate around an axis that extends substantially in a vehicle width direction, and there is provided a seatbelt holding member to hold the seatbelt anchor at a specified rotational position such that a vertical direction of the seatbelt anchor has a specified angle or less relative to an inflation direction of the curtain airbag when the seatbelt is not applied. Thereby, when the curtain airbag inflates, the lower end of the curtain airbag contacts and slides down on the inner face of the seatbelt anchor, so that the airbag can be properly prevented from catching on the seatbelt anchor.

According to another embodiment of the present invention, the inner face of the center pillar has an uneven portion that is formed near an upper edge portion of the seatbelt anchor so as to overhang in such a manner that an upper overhanging portion is located inward from an outside end portion of the upper edge portion of the seatbelt anchor. Thereby, the gap between the seatbelt anchor and the inner face of the center pillar is hidden behind the upper-overhanging portion of the uneven portion, when viewed from above. Accordingly, it becomes difficult for the curtain airbag to get into the gap, so that the airbag can be further properly prevented from catching on the seatbelt anchor.

Herein, the uneven portion is not necessary to be formed at an entire length of the center pillar. But, the uneven portion of the center pillar may be formed so as to located at least at a rear part of the center pillar. This can provide the above-described effect as well.

According to another embodiment of the present invention, the curtain airbag is configured in such a manner that the inflatable gas is supplied thereto from a specified location in front of the center pillar, there is provided an additional center pillar in front of the center pillar, and at an inner face of the additional center pillar is provided an interior member (a seatbelt anchor, for example) to project inward of the vehicle. Herein, in the case where there is provided the uneven portion described above, the airbag can be prevented from catching on this interior member as well.

According to another embodiment of the present invention, the interior member (the seatbelt anchor, for example) is provided below a line that interconnects an upper end of the rear pillar trim and a front-end fixing portion of the curtain airbag and above a line that interconnects a rear end of the uneven portion and the front-end fixing portion of the curtain airbag. Thereby, even in a case where the curtain airbag provides a tension on a straight line that interconnects the upper end of the rear pillar trim and the front-end fixing portion of the curtain airbag at an inflation initial stage, the lower end of the curtain airbag can be prevented from catching on the seatbelt anchor.

According to another embodiment of the present invention, the curtain airbag is configured in such a manner that the inflatable gas is supplied thereto from a specified location in front of the center pillar, and a rear end of the uneven portion is positioned at substantially the same height level as or below a front portion of the uneven portion that is located above the seatbelt anchor. Thereby, when the lower end of the curtain airbag lowers to the rear end of the uneven portion, this lower end goes down below the upper end of the seatbelt anchor to be located inward from the seatbelt anchor. Accordingly, the curtain airbag can be surely prevented from catching on the seatbelt anchor.

According to another embodiment of the present invention, the seatbelt anchor is located above a tension line that is generated at the curtain airbag so as to extend substantially in a vehicle longitudinal direction when the curtain airbag is in a specified inflation state. Thereby, since the tension at the moment the curtain airbag goes over the seatbelt anchor is not so large, the curtain airbag may not catch on the seatbelt anchor even if it inflates contacting the inner face of the center pillar. Thus, the proper inflation of the curtain airbag can be provided.

According to another embodiment of the present invention, the curtain airbag provides a specified tension on a line that interconnects a specified portion of a lower edge portion of the airbag that is located below a gas inlet and an upper end portion of the rear pillar trim when the curtain airbag is in a specified inflation state, and the seatbelt anchor is located above the line of the specified tension. Thereby, the above-described catching prevention effect of the curtain airbag can be obtained.

According to another embodiment of the present invention, a front end portion of the curtain airbag is fixed to a vehicle body at a point below an upper end portion of the rear pillar trim, the curtain airbag provides a specified tension on a line that interconnects the fixing point and an upper end portion of the rear pillar trim when the curtain airbag is in a specified inflation state, and the seatbelt anchor is located above the line of the specified tension. Thereby, the above-described catching prevention effect of the curtain airbag can be obtained.

According to another embodiment of the present invention, there is provided means for facilitating movement of the rear pillar trim to allow the curtain airbag to inflate outside. Thereby, the tension at the initial stage of the inflation of the curtain airbag can be made properly small, so that the catching prevention effect of the curtain airbag can be surely obtained.

According to another embodiment of the present invention, the curtain airbag is configured to inflate with a first pressing force against a specified upper portion of the inner face of the center pillar when the curtain airbag inflates pressing outward the roof trim in front of an upper end portion of the rear pillar trim and inflate with a second pressing force against a portion below the specified upper portion of the inner face of the center pillar when the curtain airbag inflates downward from the upper end portion of the rear pillar trim, the second pressing force being greater than the first pressing force, and the seatbelt anchor is located at the specified upper portion of the inner face of the center pillar. Thereby, since the pressing force at the moment the curtain airbag goes over the seatbelt anchor is relatively small, the curtain airbag may not catch on the seatbelt anchor even if it inflates contacting the inner face of the center pillar. Thus, the proper inflation of the curtain airbag can be provided.

Other features, aspects, and advantages of the present invention will become apparent from the following description which refers to the accompanying drawings.

BRIEF DESCRIPTION OF THE INVENTION

FIG. 4 is a perspective view of a portion around a rear pillar trim, when viewed from the inside.

FIG. 5 is a plan view showing a layout example of the curtain airbag in the stored state near a side window glass and a setting example of an airbag inflation direction.

DETAILED DESCRIPTION OF THE INVENTION

Hereinafter, preferred embodiments (modifications, examples) of the present invention will be descried. It should be also understood that even though the embodiments (modifications, examples) are separately described, single features thereof may be combined to additional embodiments (modifications, examples).

Embodiment 1

Figure 1:
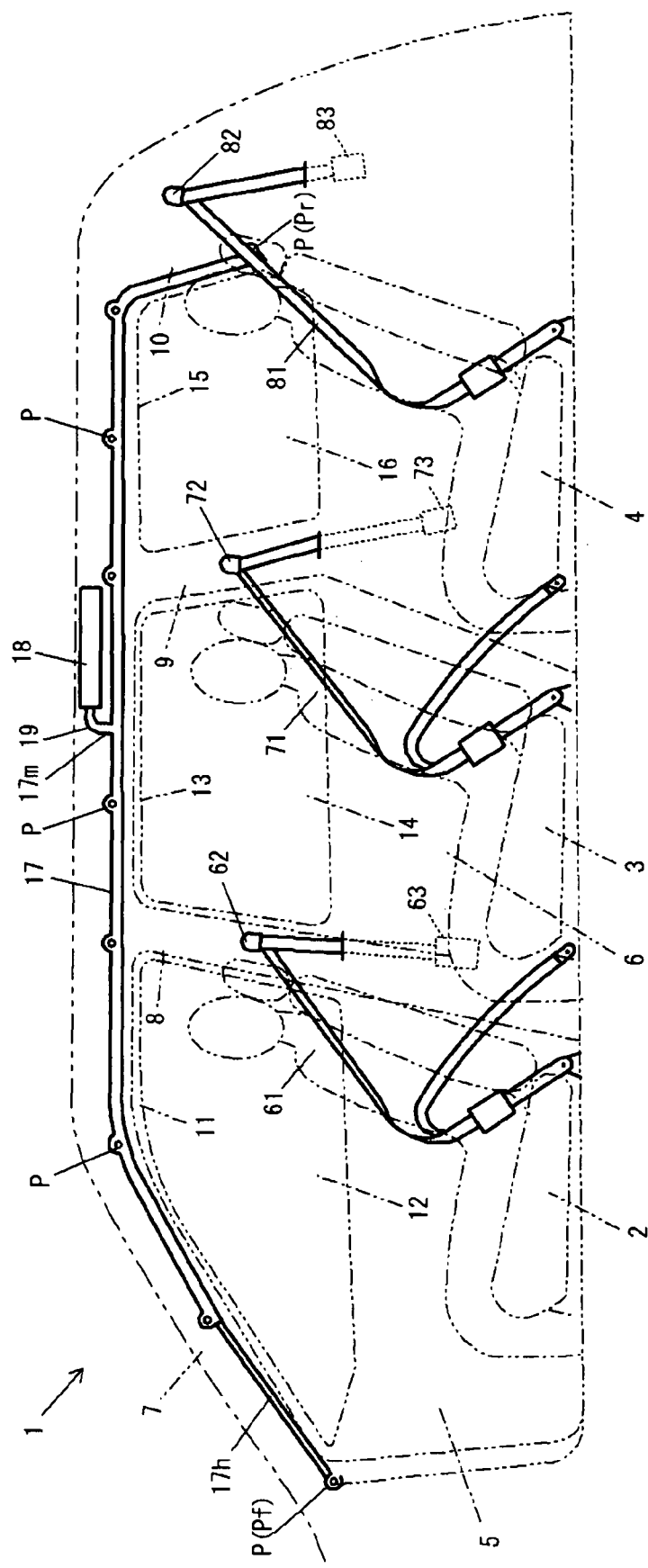
FIG. 1 is a schematic sectional view of a vehicle that is equipped with a curtain airbag in a stored state and seatbelts of a first embodiment.

A vehicle 1 comprises a front seat 2, a second row seat 3 that is provided behind the front seat 2, and a third row seat 4 that is provided behind the second row seat 3, as shown in FIG. 1. The vehicle 1 comprises a side door 5 for the front seat 2 and a side door 6 for the second row seat 3, and it also comprises an A pillar 7, a B pillar 8, a C pillar 9 and a D pillar 10, which are disposed from the front in order. Herein, the C pillar 9 corresponds to a "center pillar" and the D pillar corresponds to a "rear pillar" in the claims.

The side door 5, which opens and closes an ingress/egress opening 11 between the A pillar 7 and the B pillar 8, includes a side window glass 12 that can be driven vertically. The side door 6, which opens and closes an ingress/egress opening 13 between the B pillar 8 and the C pillar 9, includes a side window glass 14 that can be driven vertically. A rear side opening 15 is formed between the C pillar 9 and the D pillar 10, which is covered by a side window glass 16. Herein, the side window glasses 15, 16, the pillars 9, 10 and peripheral portions of these correspond to a "side window portion" in the claims.

The three side window glasses 12, 14, 16 are configured to be covered substantially entirely by a curtain airbag 17 from the inside when a vehicle side crash or a vehicle turnover occur or these are predicted, for example. The curtain airbag 17 is folded in a single bar shape in its folded state, which is fixed to a vehicle body along edge portions of the window glasses 12, 14, 16. Specifically, a front end portion of the curtain airbag 17 is fixed to a lower portion of the A pillar 7, its rear end portion is fixed to a lower portion of the D pillar 10, and its center portion is fixed to a vehicle body on a line that longitudinally interconnects respective upper edge portions of the side window glasses 12, 14, 16.

Figure 2:
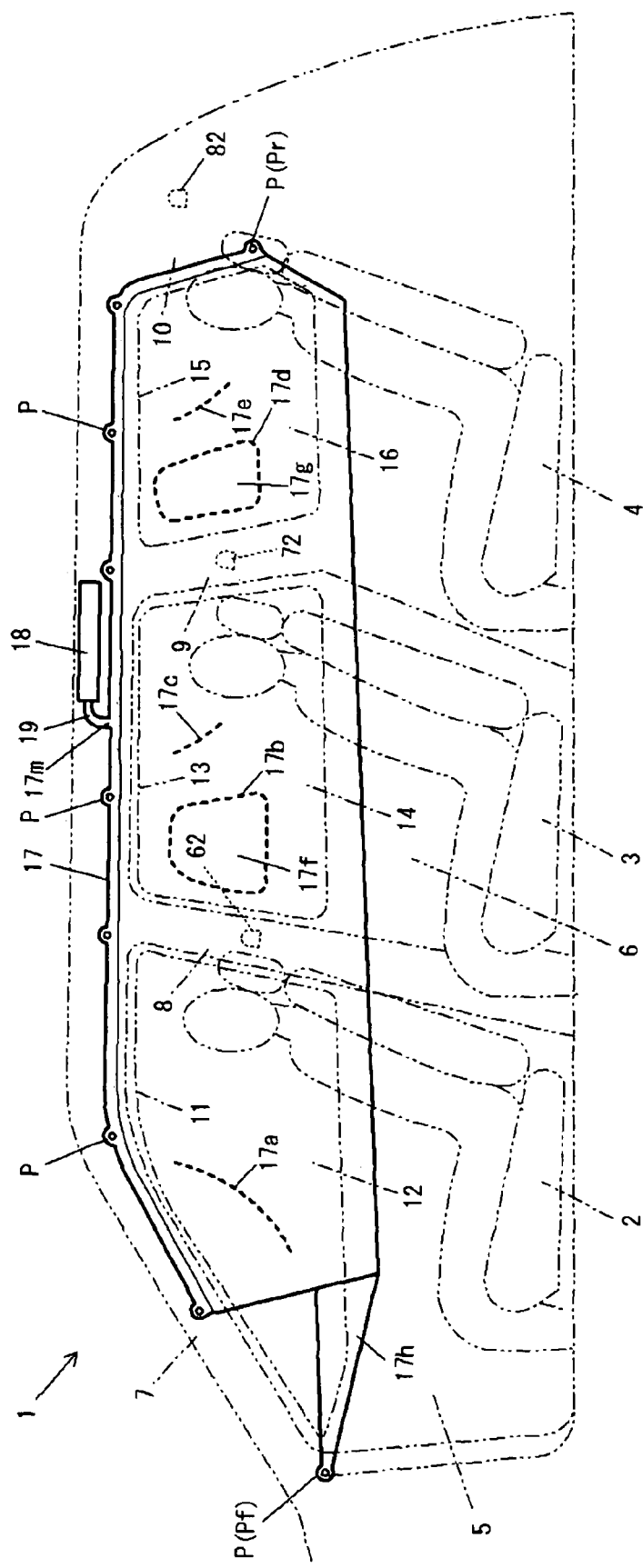
FIG. 2 is a view of the curtain airbag that inflates in a vehicle compartment, corresponding to FIG. 1.

The curtain airbag 17 inflates along the side window glasses 12, 14, 16 so as to cover all these glasses from the inside, as shown in FIG. 2. Herein, the size of the curtain airbag 17 is configured so that its lower end can be located slightly below respective lower edge portions of the side window glasses 12, 14, 16.

The curtain airbag 17 is formed in a bag shape by sewing two sheets of base clothes having substantially the same shape along their peripheries (not shown). Inflatable gas can be supplied to the curtain airbag 17 through a gas inlet 17m. At the two sheets of base clothes are provided some seams 17a-17e that are formed in a curve shape or in a closed-loop shape as shown in FIG. 2. Portions enclosed by the seams 17b, 17d form non-inflatable portions 17f, 17g, respectively, into which the gas is not supplied. The other portion forms an inflatable portion. Herein, the non-inflatable portions 17f, 17g are formed so that these portions are located at positions that are away from a head portion of a passenger seated in the seats 2-4. The provision of these non-inflatable portions may help the curtain airbag 17 inflate promptly. The seams 17a, 17c, 17e may restrain the width of the inflating curtain airbag 17 from becoming too wide. A plurality of fixing portions P . . . P are provided at the upper edge portion of the curtain airbag 17 along the upper edges of the side window glasses 12, 14, 16. A tether 17h is provided at the front end portion of the curtain airbag 17, and it is connected to the lower portion of the A pillar 7.

In the curtain airbag 17 that is stored as descried above, its inflation direction will be the direction of the airbag inflating from its stored position that is fixed to the vehicle body. For example, in a case where the curtain airbag 17 is stored in such a manner that its lower end portion is folded in a bellow shape, the direction of a lower tip end of its lower end inflating may be the inflation direction.

As shown in FIGS. 1 and 2, an inflator 18 is provided at an upper portion of the vehicle body in front of the C pillar 9, which supplies the inflatable gas to the curtain airbag 17. Gas pressure generated by the inflator 18 is supplied to the curtain airbag 17 in the stored state via a supply duct 19. A downstream end of the supply duct 9 is connected to the gas inlet 17m of the curtain airbag 17 at a location in front of the center pillar 9.

Figure 3:
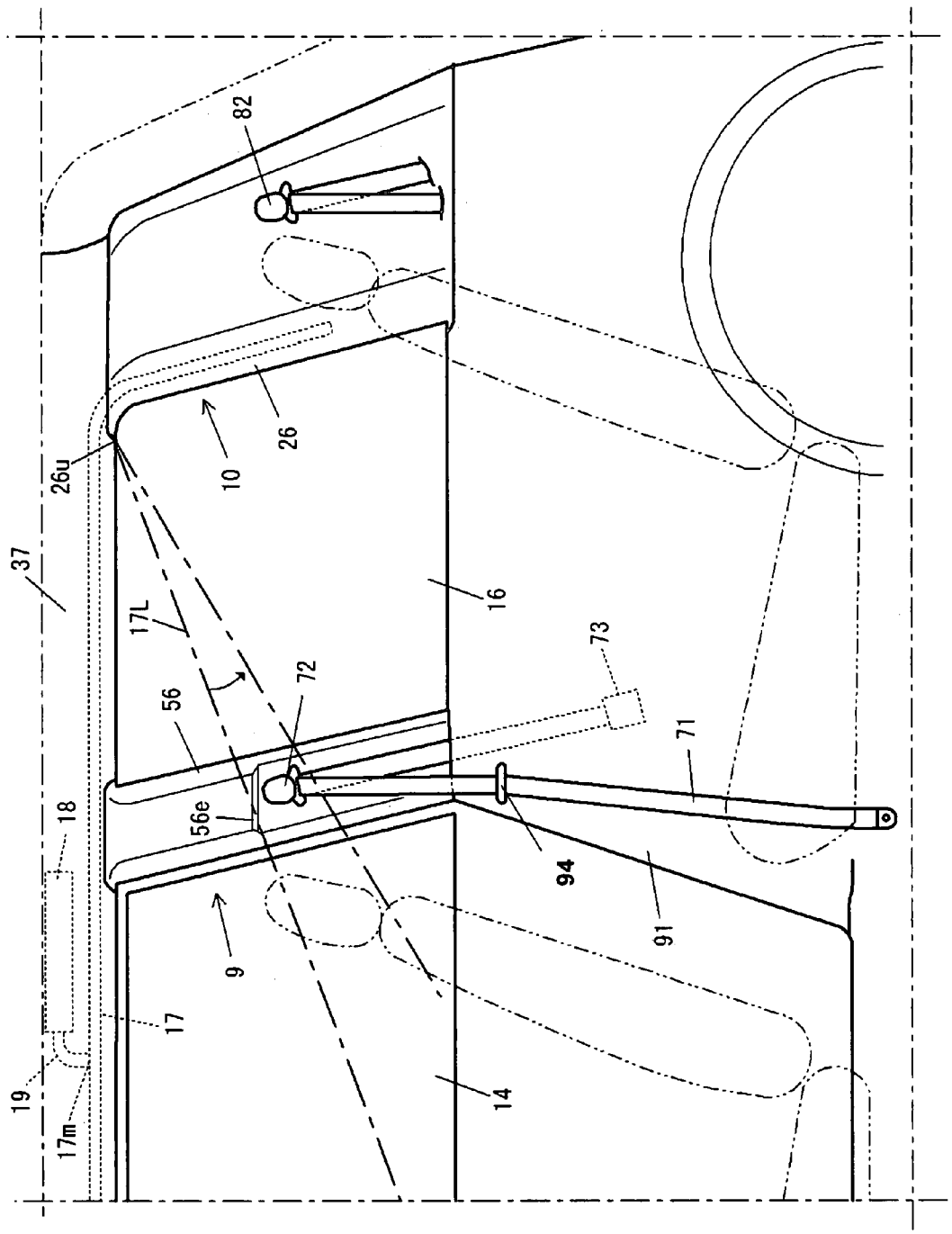
FIG. 3 is a view of a right-side rear portion of a vehicle body, when viewed from the inside.

The pillars 7-10 are covered by respective pillar trims from the inside of the vehicle. As shown in FIGS. 3 and 4, for example, the C pillar 9 is covered by a C pillar trim 56, and a D pillar 10 is covered by a D pillar trim 26. Also, a roof panel 30 (see FIG. 5) is covered by a roof trim 37 at its inside. The roof trim 37 is made of a soft and flexible material, such as a urethane foam covered by clothes, which may be easily deformed by a small force applied like a pressing force by a finger. The respective pillar trims are made of synthetic resin, such as polypropylene, which are harder than the roof trim 37. Particularly, the D pillar trim 26 is made of TPO (thermoplastic olefin) that may not be broken easily even at a considerably low temperature (minus 20 degrees centigrade or lower), thereby which may not be easily deformed by the relatively small force like the pressing force by the finger. Thus, the D pillar trim 26 particularly is so harder than the roof trim 37 that it may not be hurt improperly by any loaded baggage or the like. Herein, only a particular part of the D pillar trim 26, not a whole part of it, may be made of the above-described synthetic resin.

Figure 6:
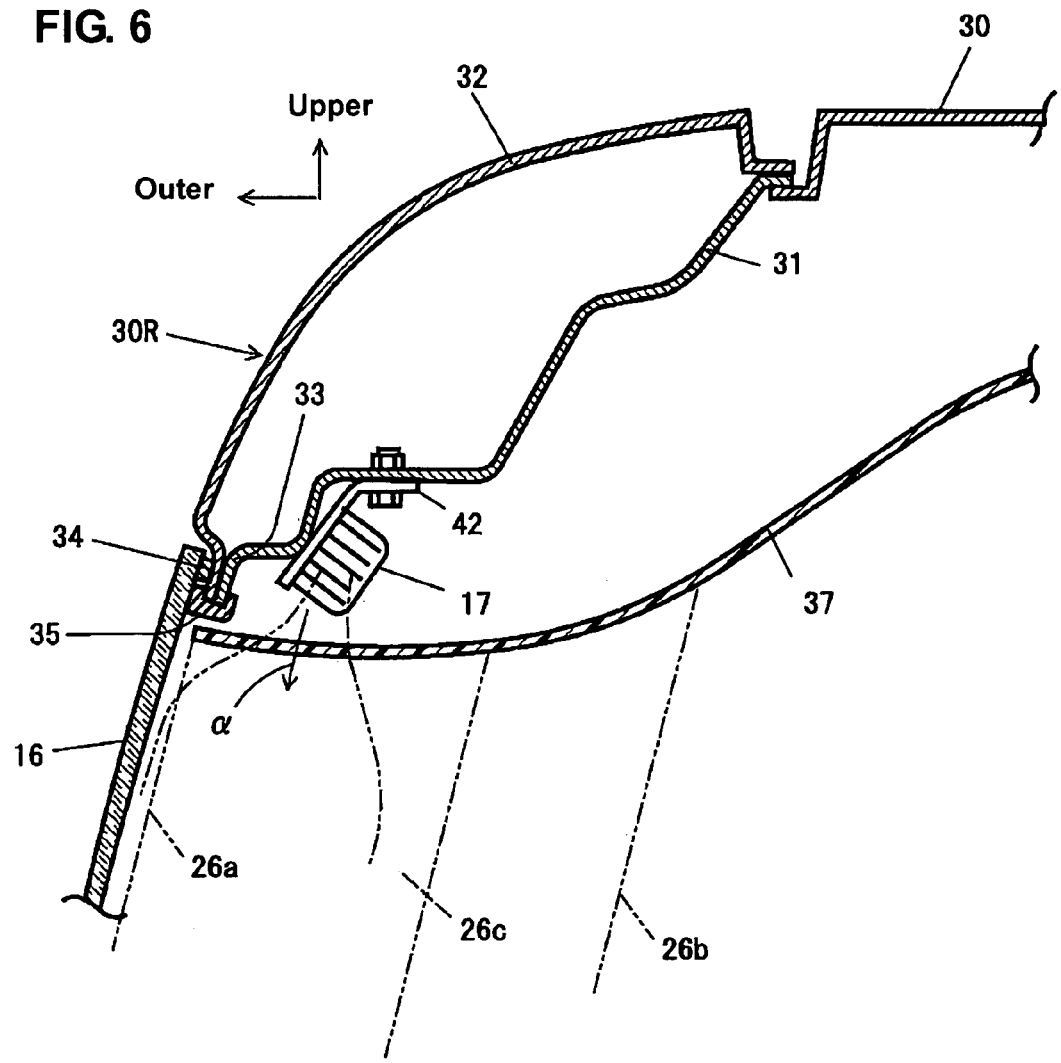
FIG. 6 is a sectional view taken along line A-A of FIG. 5.

At an outside end portion of the roof panel 30, as shown in FIG. 6, is provided a roof side rail 30R, as a reinforcement member, which comprises a roof side inner panel 31 and a roof side outer panel 32 and has its closed cross section extending longitudinally. A connecting flange 33 is formed at a lower end portion of the roof side rail 30R so as to extend downward. To this connecting flange 33 is fixed the upper edge portion of the side window glass 16 via an adhesive 34. As shown in FIGS. 4 and 6, an outside edge portion of the roof trim 37 between the C pillar trim 56 and the D pillar trim 26 projects outward a little and is located right near the side window glass 16. The outside end portion of the roof trim 37 is held at the connecting flange 33 with an edge molding 35.

Figure 7:
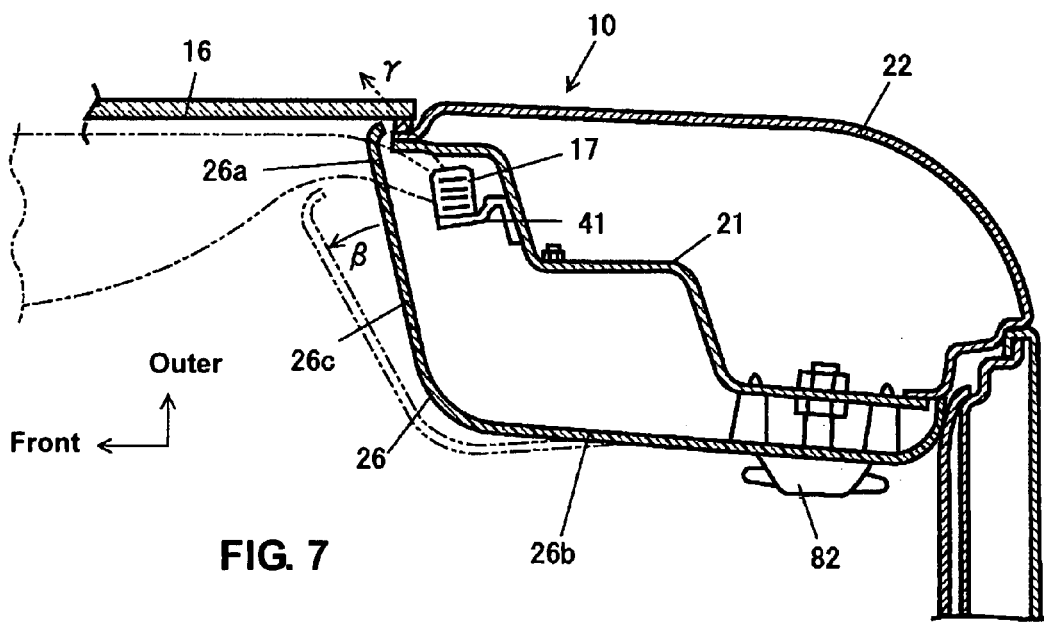
FIG. 7 is a sectional view taken along line B-B of FIG. 4.
Figure 8:
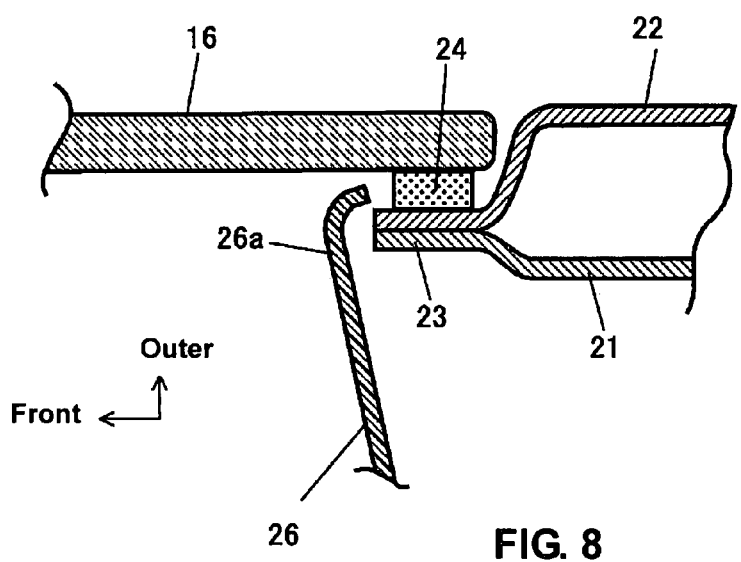
FIG. 8 is an enlarged sectional view of a major part of FIG. 7.

The D pillar 10 is formed to have a closed cross section with an inner panel 21 and an outer panel 22, and has a connecting flange 23 to extend forward a little at its front end portion as shown in FIG. 7. A rear edge portion of the side window glass 16 is fixed to an outer face of the connecting flange 23 via an adhesive 24 as shown in FIG. 8. The D pillar trim 26 covering the D pillar 10 is formed to have a substantially L-shaped cross section in a horizontal direction as shown in FIG. 7, which comprises a side face portion 26b that extends widely in the vehicle longitudinal direction and a front face portion 26c that extends outward from a front end of the side face portion 26b and widely in the vehicle width direction. An outside edge portion 26a (hereinafter, referred to as a specified edge portion 26a) of the front face portion 26c is located right near the rear edge portion of the side window glass 16 and extends near the connecting flange 23. The front face portion 26c is, as shown in FIG. 5, provided slightly slant in the plan view (when viewed from the top of the vehicle body) in such a manner that the specified edge portion 26a is located gradually rearward.

Figure 9:
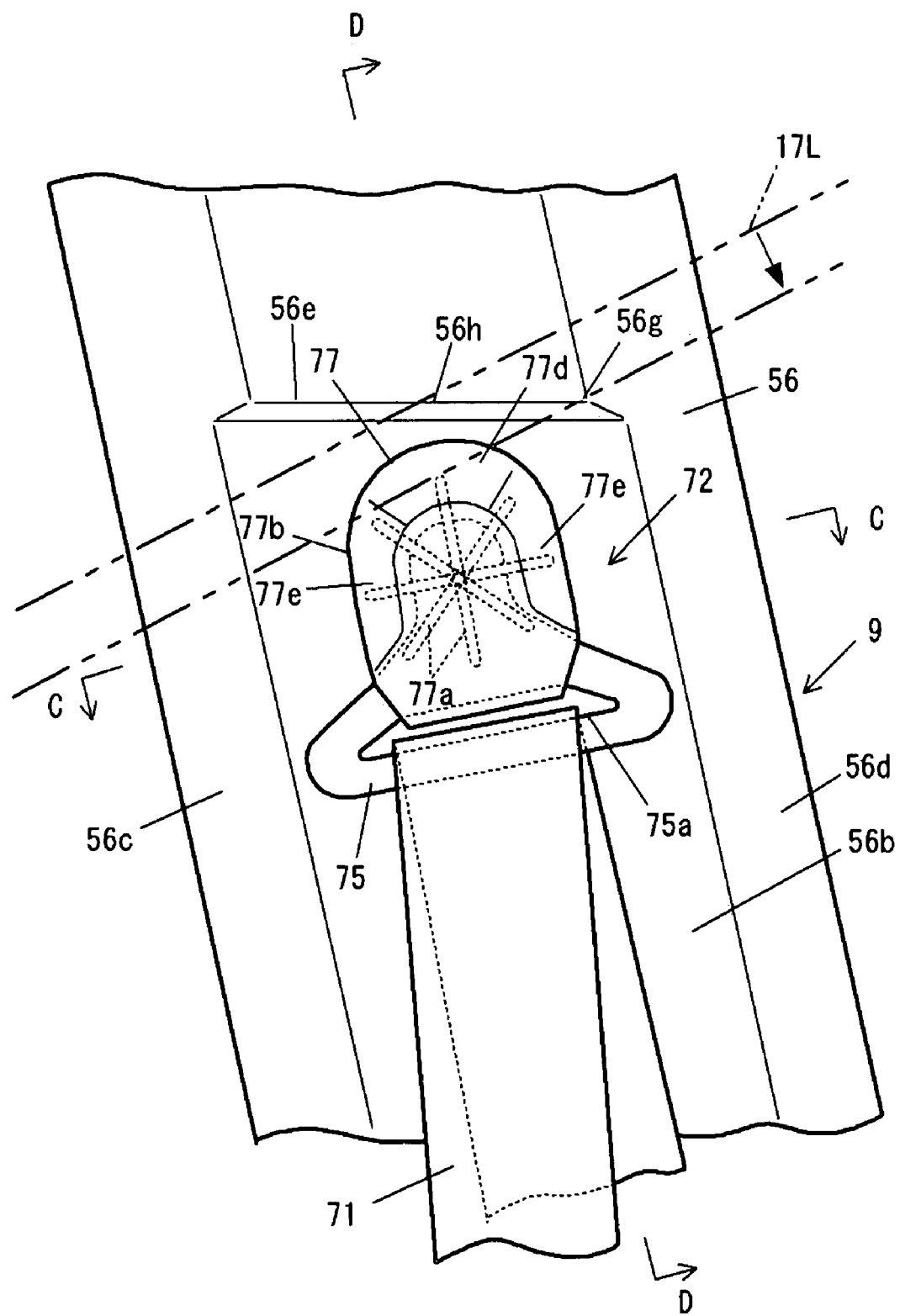
FIG. 9 is a view of a C pillar, when viewed from the inside.
Figure 10:
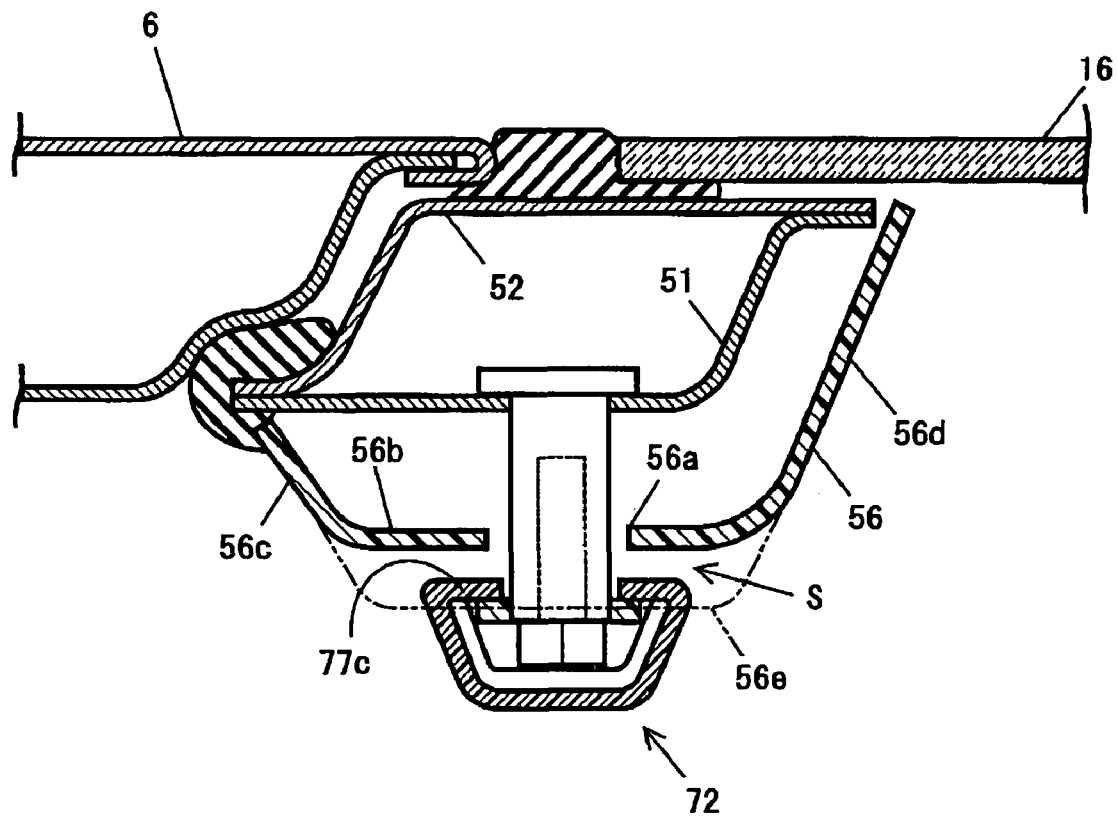
FIG. 10 is a sectional view taken along line C-C of FIG. 9.
Figure 11:
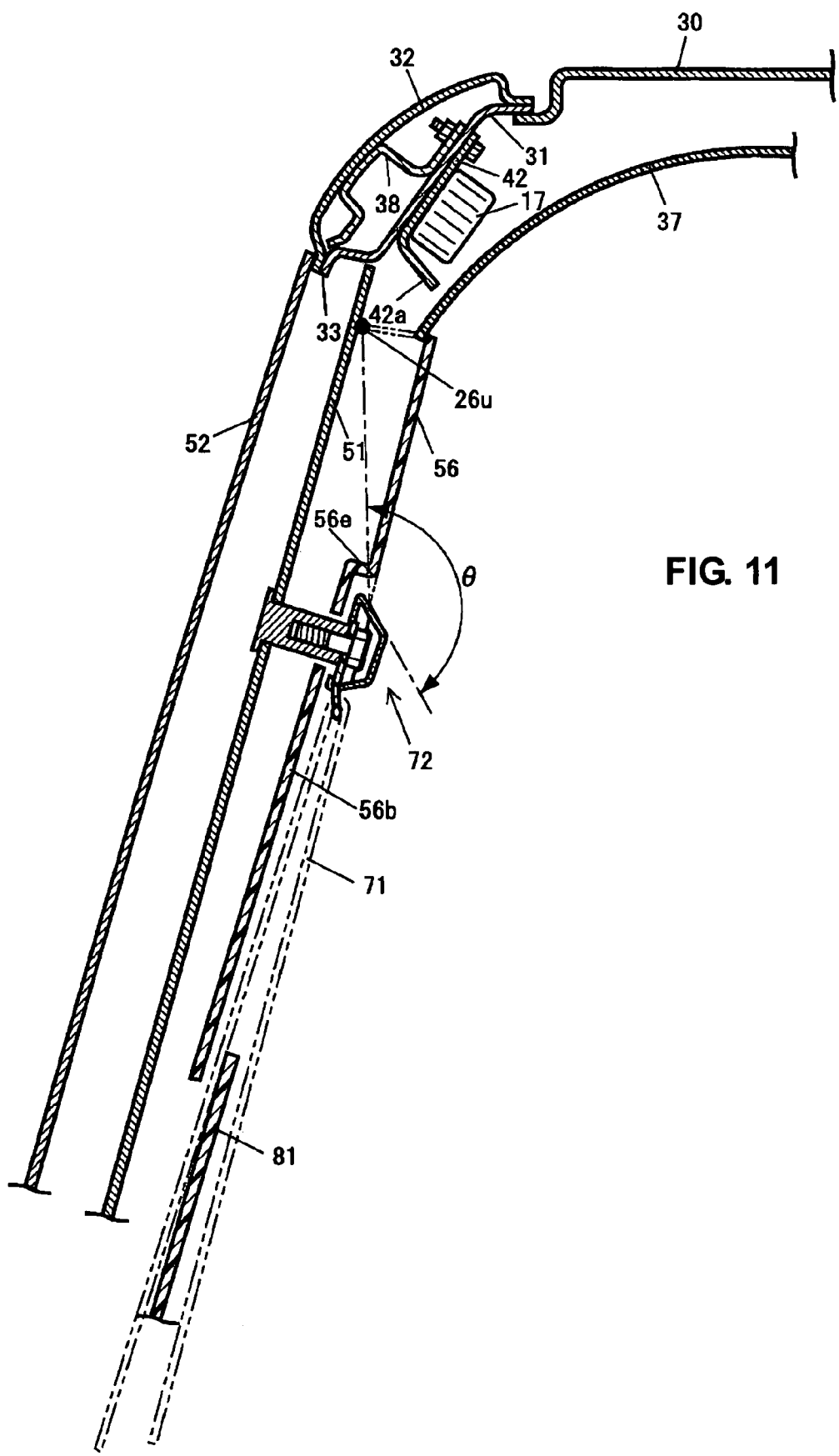
FIG. 11 is a sectional view taken along line D-D of FIG. 9.

As shown in FIGS. 9-11, the C pillar 9 is formed to have a closed cross section with an inner panel 51 and an outer panel 52, and an upper end of the C pillar trim 56 covering the C pillar 9 from the inside is slightly away from the inner face (inner panel 51) of the C pillar 9 to generate a gap between the C pillar 9 and the C pillar trim 56 in the vehicle width direction.

The curtain airbag 17 in the stored state is fixed to the vehicle body via attaching brackets 41, 42 and others as shown in FIGS. 6, 7 and 11. The attaching bracket 41 shown in FIG. 7 is the one for the D pillar 10, and the attaching bracket 42 shown in FIG. 11 is the one for the roof side frame 30R. The attaching bracket 42 has an extension portion 42a that extends downward. This extension portion 42a is provided slant in such a manner that its lower-side portion is located inward and it is directed slightly inward from the inside end portion of the C pillar trim 56. This extension portion 42a can guide the curtain airbag 17 inflating properly and surely, without any interference with the C pillar trim 56.

An exemplified provision of the curtain airbag 17 in the stored state along the portion from the upper edge portion to the rear edge portion of the side window glass 16 will be descried referring to FIG. 5. Herein, an illustration of the above-described attaching brackets 41, 42 is omitted to make the provision state of the curtain airbag 17 clearer in this figure. As apparent from FIG. 5, the curtain airbag 17 in the stored state is provided in such a manner that it extends substantially longitudinally from the front end portion to the rear end portion of the upper edge portion of the side window glass 16 in the plan view, and that its portion extending along the rear edge portion of the side window glass 16 is located at the most outside position. The inflator 18 extending longitudinally is foxed to the roof side rail 30R via an attaching bracket, not illustrated.

Beside the seats 2, 3, 4 are provided respective seatbelts 61, 71, 81 as shown in FIG. 1. One ends of the seatbelts 61, 71, 81 are respectively accommodated in retractors 63, 73, 83 via seatbelt anchors 62, 72, 82 that are attached to the B, C and D pillars 8, 9, 10.

Figure 12:
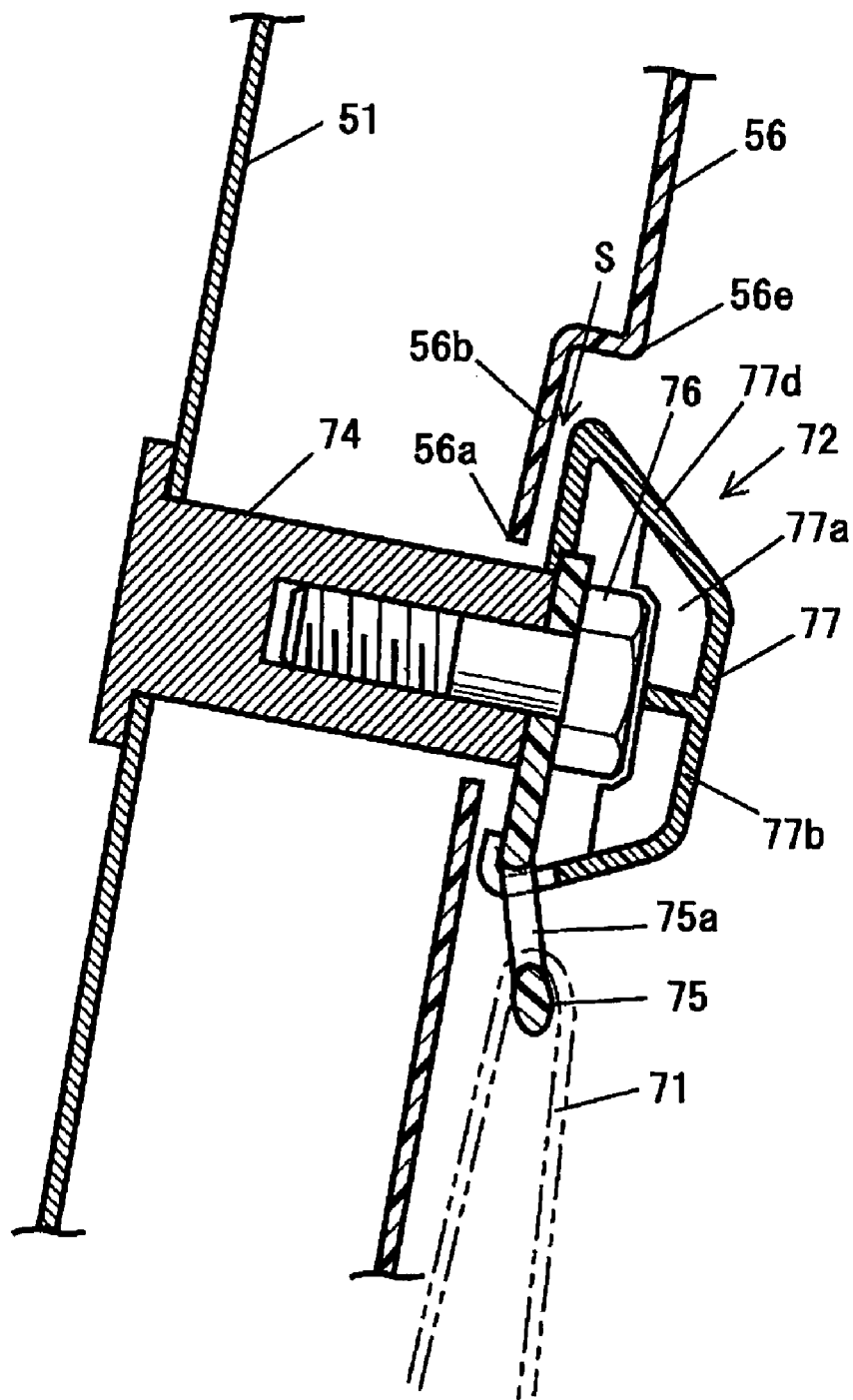
FIG. 12 is an enlarged sectional view of a major part of FIG. 11.

Hereinafter, the structure of the seatbelt anchor 72 attached to the C pillar 9, which is related to the present invention, will be described specifically. As shown in FIG. 12, the seatbelt anchor 72 is fixed to the inner panel 51 at its one end, and the other end of the seatbelt anchor 72 comprises a boss member 74 that extends through a hole portion 56a formed at the C pillar trim 56, a seatbelt engaging member 75 that has a hole 75a for the seatbelt 71, a bolt 76 that rotatably attaches the engaging member 75 to the boss member 74, and a case 77 that covers the engaging member 75 and a head of the bolt 76. A plurality of ribs 77a are formed at an inner face of the case 77. The ribs 77a can absorb the impact when the seatbelt anchor 72 is hit by a passenger body or the like. Accordingly, there is a limit to an minimization of the width (thickness) of the seatbelt anchor 72. Further, there exists a small gap S between the upper face portion of the C pillar trim 56 and a lower face portion 77c of the case 77 that faces the C pillar trim 56. This gap S is to provide a smooth rotation of the seatbelt anchor 72 and to absorb any manufacturing error and prevent any improper contact noises of the members. That is, the seatbelt anchor 72 is provided to project inward from the inner face of the C pillar trim 56 so as to meet the above-described needs.

Herein, there is provided a slant face 77d at an upper portion of an surface portion 77b of the seatbelt anchor 72. The slant face 77d is formed in such a manner that its lower portion is located inward. The slant face 77d is slant relative to a horizontal face that is substantially perpendicular to the face of the C pillar trim 56. At a side portion of the surface portion 77b is provided a slant face 77e that is steeper than the above-described slant face 77d. Namely, the incline of the upper portion of the seatbelt anchor 72 is gentler than that of a front portion of the seatbelt anchor 72. Further, since the incline of the slant face 77d is not so steep, the seatbelt anchor 72 is configured so that the length from its rotational center to its upper end is longer than that from its rotational center to its front or rear end. According to the above-described structure of the slant faces, in a case where the head of the passenger hits the seatbelt anchor 72 from above, it may tend to hit against the slant face 77d. Thereby, the impact absorption may be improved.

Herein, the slant of the slant face 77d is configured, as shown in FIG. 11, so that an angle θ that is formed between a line interconnecting an intersection point of an extension line extending from the inner face of the C pillar trim 56 and the slant face 77d and an front edge upper end 26u of the D pillar trim 26 and a line of the incline of the slant face 77d is within a range of approximately 120 to 200 degrees. In the case shown in FIG. 11, the angle θ is set about 150 degrees.

Figure 13:
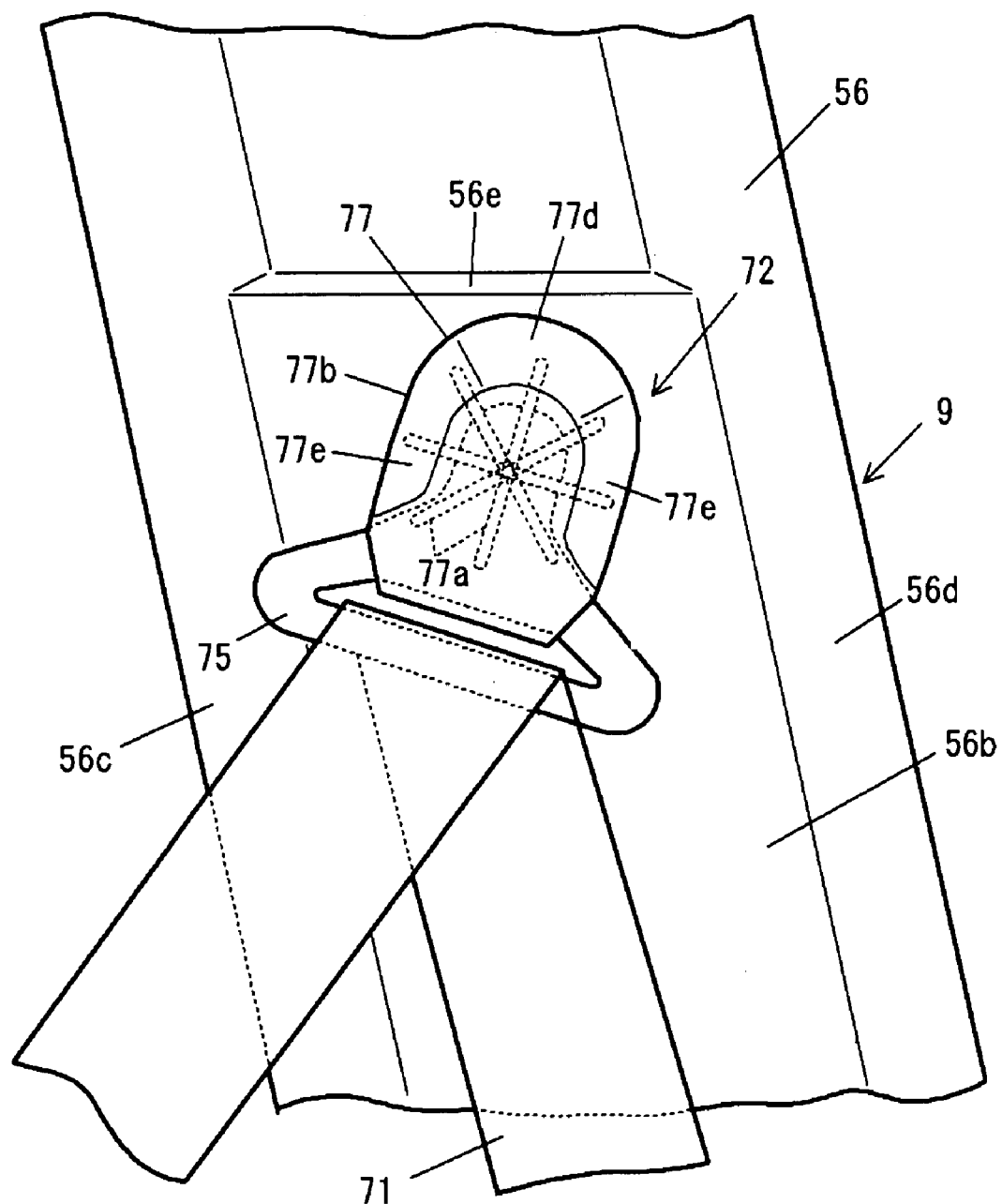
FIG. 13 is a view of a seatbelt anchor in a specified-angle rotated state, corresponding to FIG. 9.

Herein, the slant face 77d is provided in such a manner that a clear rearview from a deriver's seat is not substantially deteriorated by the seatbelt anchor 72 that rotates by a specified rotational angle (for example, an angle of counterclockwise 60 degrees from the state shown in FIG. 9 to the state shown in FIG. 13) due to application of the seatbelt 71. Specifically, the slant face 77d is formed on the surface portion 77b in such a manner that when the seatbelt anchor 72 rotates by the specified rotational angle, the slant face 77d formed is positioned even at the upper end of the seatbelt anchor 72. Thereby, the seatbelt anchor 72 may not deteriorate the clear rearview from the deriver's seat properly, compared to a case where the slant face 77*d* is not formed on the surface portion 77*b* and therefore the upper portion of the surface portion 77*b* projects toward the inside of the vehicle to a certain degree. The above-described specified rotational angle may be set properly by considering relationships of seatbelt anchor 72 and the second row seat 3 in their longitudinal positions.

The C pillar trim 56 comprises a lower face portion 56*b* that is substantially in parallel to the side face of the vehicle body, a front slant face portion 56*c* that extends forward and outward from the lower face portion 56*b*, and a rear slant face portion 56*d* that extends rearward and outward. Thus, the C pillar trim 56 is formed in a curve shape in such a manner that its central portion projects toward the inside of the vehicle as shown in FIG. 10.

Both the lower face portion 56*b* of the C pillar trim 56 and the lower face portion 77*c* of the seatbelt anchor case 77 have a flat face facing each other substantially in parallel with the above-described gap S between them. Herein, the width of the lower face portion 56*b* of the C pillar trim 56 in the longitudinal direction is set such that the outer periphery of the surface portion 77*b* of the seatbelt anchor case 77 may not extend beyond the front slant face portion 56*c* and the rear slant face portion 56*d* when the anchor 77 rotates as shown in FIG. 13. Thereby, even when the seatbelt anchor 72 rotates counterclockwise by the specified angle (60 degrees, for example) due to the application of the seatbelt 71 to the passenger as shown in FIG. 13, the gap S in the vehicle width direction between the lower face portion 56*b* of the C pillar trim 56 and the lower face portion 77*c* of the seatbelt anchor 72 may become large. Herein, the outer periphery of the seatbelt anchor 77 may be configured not to extend beyond the front slant face portion 56*c* or the rear slant face portion 56*d*.

As shown in FIG. 3, a seatbelt holding member 94 is provided at a portion of a quarter trim 91 forming the inner face of the vehicle rear portion that is located below the C pillar 9. The seatbelt holding member 94, which is a U-shaped clip member with an front-open end in the plan view, functions as a member to hold the seatbelt 71 when the seatbelt 71 is not applied to the passenger. Herein, the seatbelt holding member 94 is provided in such a manner that when the seatbelt 71 is inserted into its front-open end portion to be held by the holding member 94, the seatbelt anchor 72 can be held such that its vertical direction has a specified angle (±30 degrees) or less relative to the inflation direction of the curtain airbag 17 that is located at the C pillar trim 56 (a direction perpendicular to a lower-end line 17L of the curtain airbag 17), as shown in FIG. 9.

The lower face portion 56*b* of the C pillar trim 56 of the C pillar 9 has an uneven portion 56*e* that is formed near the upper edge portion of the seatbelt anchor 72 so as to overhang in such a manner that the upper overhanging portion is located inward from an outside end portion of the upper edge portion of the seatbelt anchor 72. In other words, the amount of projection of the overhanging portion toward the inside is set to be greater than the above-describe gap S. The uneven portion 56*e* extends substantially horizontally in the longitudinal direction, and its rear end 56*g* is positioned at the same height level as a portion 56*h* that is located above the seatbelt anchor 72.

Figure 14:
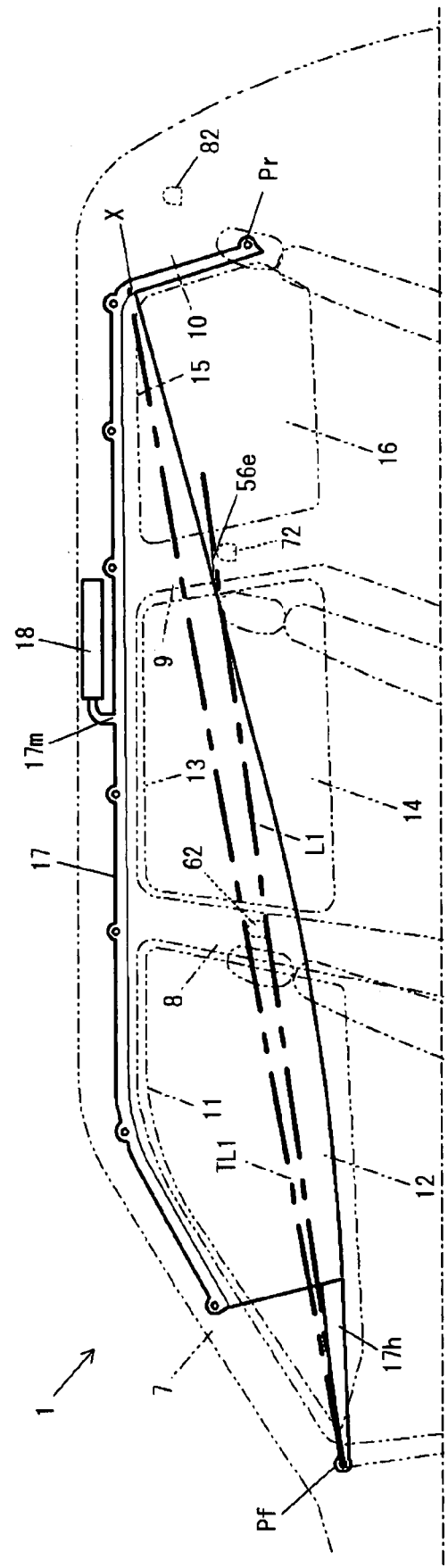
FIG. 14 is a view of the curtain airbag in a specified inflation state, corresponding to FIG. 2.

The seatbelt anchor 62 provided at the B pillar 8 is located, as shown in FIG. 14, lower a straight line TL1 that interconnects an upper end of the D pillar trim 26 and a front-end fixing portion Pf of the curtain airbag 17 and above a straight line L1 that interconnects the rear end of the uneven portion 56*e* and the front-end fixing portion Pf of the curtain airbag 17.

Next, the operation of the structure described above will be described. When the vehicle side crash or the vehicle turnover are detected or predicted while the curtain airbag 17 is in the stored state, the inflator 18 is activated. The gas pressure generated by the inflator 18 is supplied to the curtain airbag 17, and then the curtain airbag 17 inflates in the vehicle as shown in FIG. 2.

The inflation of the curtain airbag 17 progresses in the downward direction shown by an arrow α in FIG. 6 (the inflated curtain airbag 17 is shown by a one-dotted broken line). The roof trim 37 is so soft that it can be easily deformed downward. Also, the inflation of the curtain airbag 17 is carried out by moving (deforming) at least an upper portion of the outside edge portion 26*a* of the D pillar trim 26 in the forward direction shown by an arrow β in FIG. 7 (the inflated curtain airbag 17 is shown by a one-dotted broken line). In FIG. 7 the curtain airbag 17 inflates through a gap generated between the side window glass 16 and the outside edge portion 26*a*. Herein, the curtain airbag 17 includes an inflatable portion to inflate in the vehicle width direction at the outside edge portion 26*a*. Therefore, the upper portion of the outside edge portion 26*a* needs to be moved forward and toward the inside of the vehicle sufficiently. A portion of the curtain airbag 17 along the rear edge portion of the side window glass 16 is directed outward greatly as shown by an arrow 7 in FIG. 7. Accordingly, the gap between the outside edge portion 26*a* and the side window glass 16 that is a passage of the curtain airbag 17 inflating can be properly small.

Herein, the gas inlet 17*m* for the curtain airbag 17 is located in front of the center pillar 9, so the inflatable gas will be supplied mainly toward a front part of the airbag. The D pillar trim 9 is made of relatively hard synthetic resin, so the rear end portion of the curtain airbag 17 may not inflate easily. Accordingly, the rear end portion of the airbag may remain inside the rear pillar trim even if the front portion of the airbag has already inflated outside. Namely, in a case where the inflatable gas is arranged to be mainly supplied toward the front portion (corresponding to the front seat 2, for example) of the curtain airbag 17 at the initial stage of the airbag inflation with the provision of the non-inflatable portions 17*f*, 17*g* and seams 17*a*, 17*c*, 17*e* of the curtain airbag 17, the airbag shows its inflation state shown in FIG. 14, for example. In this case, the upper portion of the rear end portion of the curtain airbag 17 catches on the front edge portion of the upper end portion of the D pillar trim 26, so the tension line TL1 may be generated on the line that interconnects the front-end fixing point Pf and an front edge portion X of the upper end portion of the D pillar trim 26.

Figure 16:
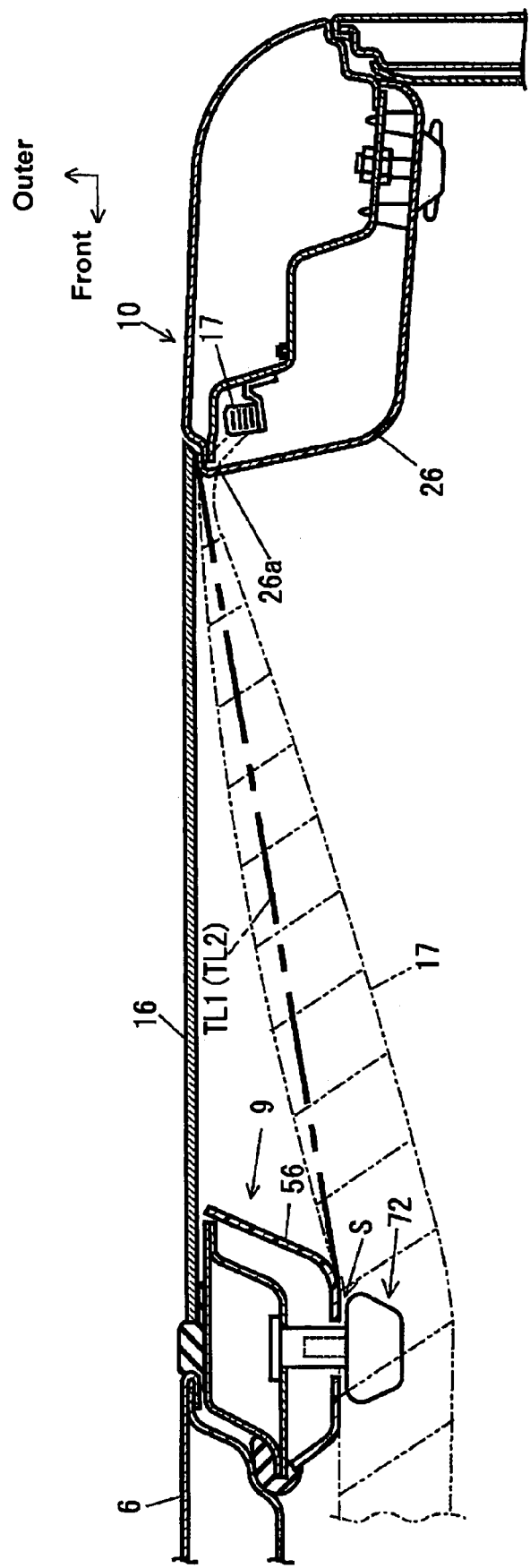
FIG. 16 is an explanatory diagram of the inflation of the airbag at an inflation initial stage, corresponding to FIGS. 5 and 9.

This state will be described further. As shown in FIG. 16, since the specified edge portion 26*a* of the D pillar trim 26 is located outward from the inner face of the C pillar trim 56 of the C pillar 9, the curtain airbag 17 inflates so as to lower contacting the C pillar trim 56 by the pressing of the above-described tension. Herein, at an early stage that the curtain airbag 17 inflates as shown in FIG. 14, the outside face of the curtain airbag 17 may contact the C pillar trim 56, but its pressing force is relatively small compared to a later stage that the curtain airbag 17 inflates toward the lower portion of the D pillar trim 26. That is, when the curtain airbag 17 inflates pressing against outward the forward portion of the roof trim 37 that is located in front of the upper end portion of the D pillar trim 26, it inflates with a first pressing force against the upper part of the C pillar trim 56 that is positioned above the tension line TL1. Meanwhile, when the curtain airbag 17 inflates downward from the upper end portion of the D pillar trim 26, it inflates with a second pressing force, which is greater than the first pressing force, against the lower part of the C pillar trim 56 that is positioned below the tension line TL1. Accordingly, if the seatbelt anchor 72 is located above or below the tension line L1, the curtain airbag 17 may easily catch on this anchor 72 during its further inflation. Further, the lower edge portion of the curtain airbag 17 may easily get into the gap S between the case 77 of the seatbelt anchor 72 and the C pillar trim 56.

According to the present embodiment, the slant face 77d is provided at the case 77 of the seatbelt anchor 72 in such a manner that its lower portion is located inward, as described above. Thereby, even if the lower end of the inflating curtain airbag 17 contacts the inner face of the seatbelt anchor 72, the airbag 17 can be properly prevented from catching on the seatbelt anchor 72. Accordingly, any deterioration of the inflation of the airbag can be prevented.

Further, according to the present embodiment, the inner face of the C pillar 9 has the uneven portion 77e that is formed near the upper edge portion of the seatbelt anchor 72 so as to overhang in such a manner that the upper overhanging portion is located inward from the outside end portion of the upper edge portion of the seatbelt anchor 72, as described above. Thereby, the gap S between the seatbelt anchor 72 and the upper face 56b of the C pillar trim 56 of the C pillar 9 is hidden behind the upper-overhanging portion of the uneven portion 77e, when viewed from above. Accordingly, it becomes difficult for the curtain airbag 17 to get into the gap S, so the airbag 17 can be further properly prevented from catching on the seatbelt anchor 72. Making the gap S small or providing the slant face 77d are particularly effective in the case where the seatbelt anchor 72 is located above or below the tension line TL1.

Figure 15:
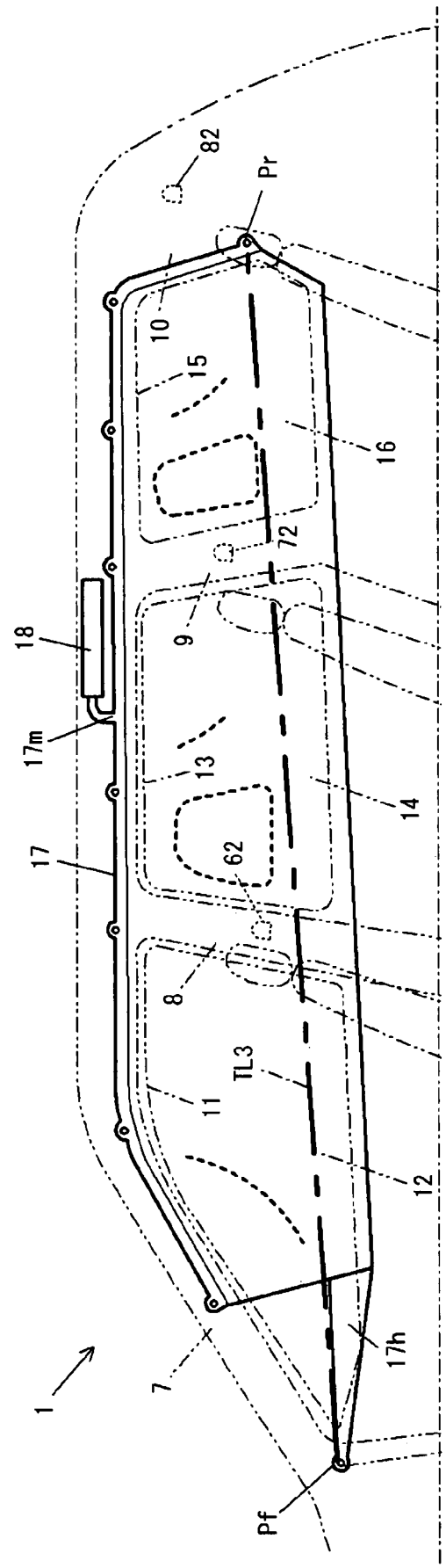
FIG. 15 is a view of the curtain airbag in an inflation complete state, corresponding to FIG. 2.

Then, when the inflation proceeds to the complete state (specified inflation state) as shown in FIG. 15, the curtain airbag 17 provides a tension line TL3 on a line that interconnects the front fixing point Pf and a rear fixing point Pr, thereby generating a sufficient resistance force against the vehicle turnover or the like.

Further, according to the present embodiment, the seatbelt anchor 72 is provided so as to rotate around the axis 74 that extends substantially in the vehicle width direction, and the above-described slant face 77d is provided in such a manner that the clear rearview from the deriver's seat is not substantially deteriorated by the seatbelt anchor 72 rotating by the specified rotational angle. Thereby, in addition to the above-described effects, an effect of improvement of the clear rearview from the driver's seat can be obtained.

Also, the gap S in the vehicle width direction between the upper face portion 56b of the C pillar trim 56 and the lower face 77c of the seatbelt anchor 72 that faces the upper face 56b of the trim 56 when the seatbelt anchor 72 rotates due to the application of the seatbelt 71 to the passenger as shown in FIG. 13 is configured not to become larger than the gap at the time of an non-application of the seatbelt 71. Thereby, in the seatbelt anchor 72 in that the length from its rotational axis to its upper end is configured to be longer than the length from its rotational axis to its front end or rear end in order to provide the slant face 77d like the present embodiment, the lower end of the curtain airbag 17 from getting into the gap S despite the rotation of the seatbelt anchor 72. Thus, the airbag 17 can be prevented from catching.

Namely, if the longitudinal length of the lower face portion 56b of the C pillar trim 56 is short, in a case where the C pillar trim 56 is inclined forward, the rear end of the seatbelt anchor 72 may move rearward beyond the lower face portion 56b to the position corresponding to the rear slant face portion 56d, so that the gap S may become improperly large. According to the present embodiment, however, such a situation may not occur.

Further, there is provided the seatbelt holding member 94 in such a manner that when the seatbelt 71 is not applied, the seatbelt anchor 72 is held such that its vertical direction is directed in the inflation direction of the curtain airbag 17. Thereby, the lower end of the curtain airbag 17 contacts and slides down on the inner face of the seatbelt anchor 72, so that the airbag 17 can be properly prevented from catching on the seatbelt anchor 72.

Herein, according to the curtain airbag 17 of the present embodiment, as described above, the front side portion of the airbag 17 inflates first until its rear end portion inflates outward from the D pillar trim 26. Thus, the lower end line 17L of the curtain airbag 17 becomes a line that extends from the front edge upper end 26u of the D pillar trim 26, as shown in FIG. 3, and rotates counterclockwise around this front edge upper end 26u in accordance of the rotation of the airbag 17.

In the present embodiment, the rear end 56g of the uneven portion 56e is positioned at the same height level as the portion 56h that is located above the seatbelt anchor 72. Thereby, as apparent from the lower end line 17L shown in FIG. 9, when the lower line 17L of the curtain airbag 17 lowers to the rear end 56g of the uneven portion 56e, this lower end goes down below the upper end of the seatbelt anchor 72 and is located inward from the seatbelt anchor 72. Accordingly, the curtain airbag 17 can be surely prevented from catching on the seatbelt anchor 72.

Moreover, while the seatbelt anchor 62 is provided at the inner face of the B pillar 8, the uneven portion 56e is provided at the C pillar 9 of the present embodiment, so the curtain airbag 17 is likewise moved inward even at the portion of the B pillar 8 and thereby the curtain airbag 17 may be prevented from catching on the seatbelt anchor 62 at this position as well.

Herein, even in the case where the curtain airbag 17 provides the tension line TL1 on the straight line that interconnects the upper end of the rear pillar trim 26 and the front fixing point Pf of the curtain airbag 17 at the inflation initial stage as described above, the curtain airbag 17 can be surely moved inward at the existing position of the seatbelt anchor 62 by providing the seatbelt anchor 62 at a portion of the B pillar 8 that is located below the tension line TL1 and above the straight line L1 interconnecting the rear end of the uneven portion 56e and the front fixing portion Pf of the curtain airbag. Thereby, the lower end of the curtain airbag 17 can be further surely prevented from catching on the seatbelt anchor 62. The present invention is applicable to a known type of seatbelt anchor 62 that can slide vertically.

Herein, the uneven portion 56e may be configured in different manners as described below.

Figure 17:
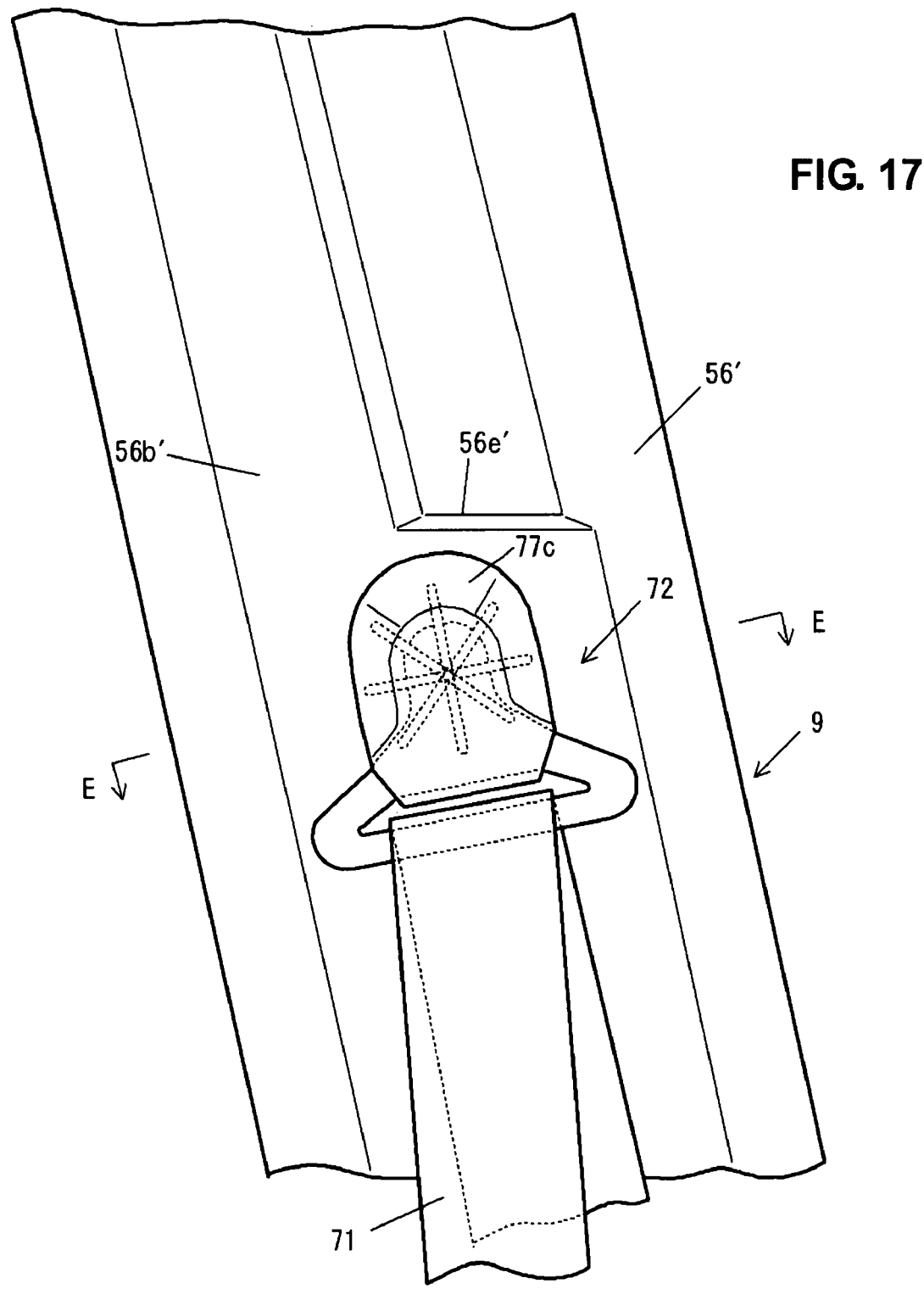
FIG. 17 is a view of a first modification of an uneven portion, corresponding to FIG. 9.
Figure 18:
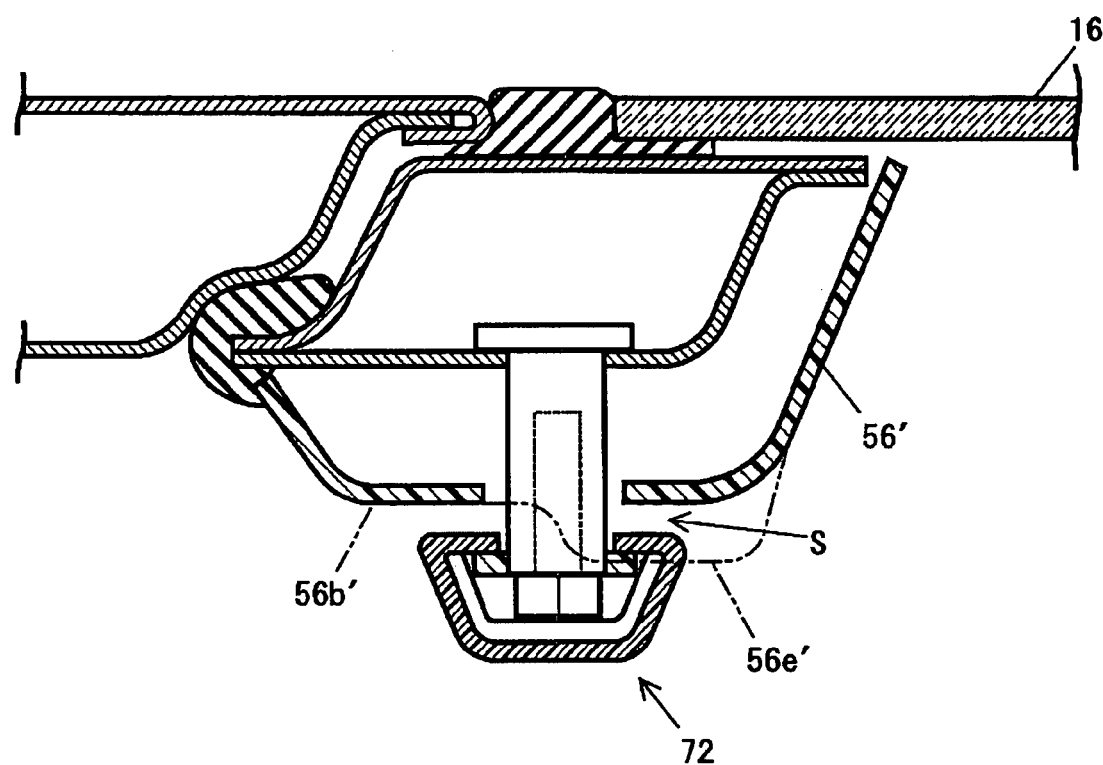
FIG. 18 is a sectional view taken along line E-E of FIG. 16.

While the above-described uneven portion 56e of the C pillar 9 is provided over the longitudinal length of the lower face portion 56b of the C pillar 9, its modification shown in FIGS. 17 and 18 is configured so that its uneven 56e' of its C pillar 56' is provided only at the rear side portion of the lower face portion 56b'. According to the modification, likewise, the curtain airbag 17 is moved inward (toward the inside of the vehicle) and the same operation can be attained. Herein, the uneven portion may be provided at a further rearward portion or at a forward portion, and thus a design flexibility of the C pillar trim may be increased.

Figure 19:
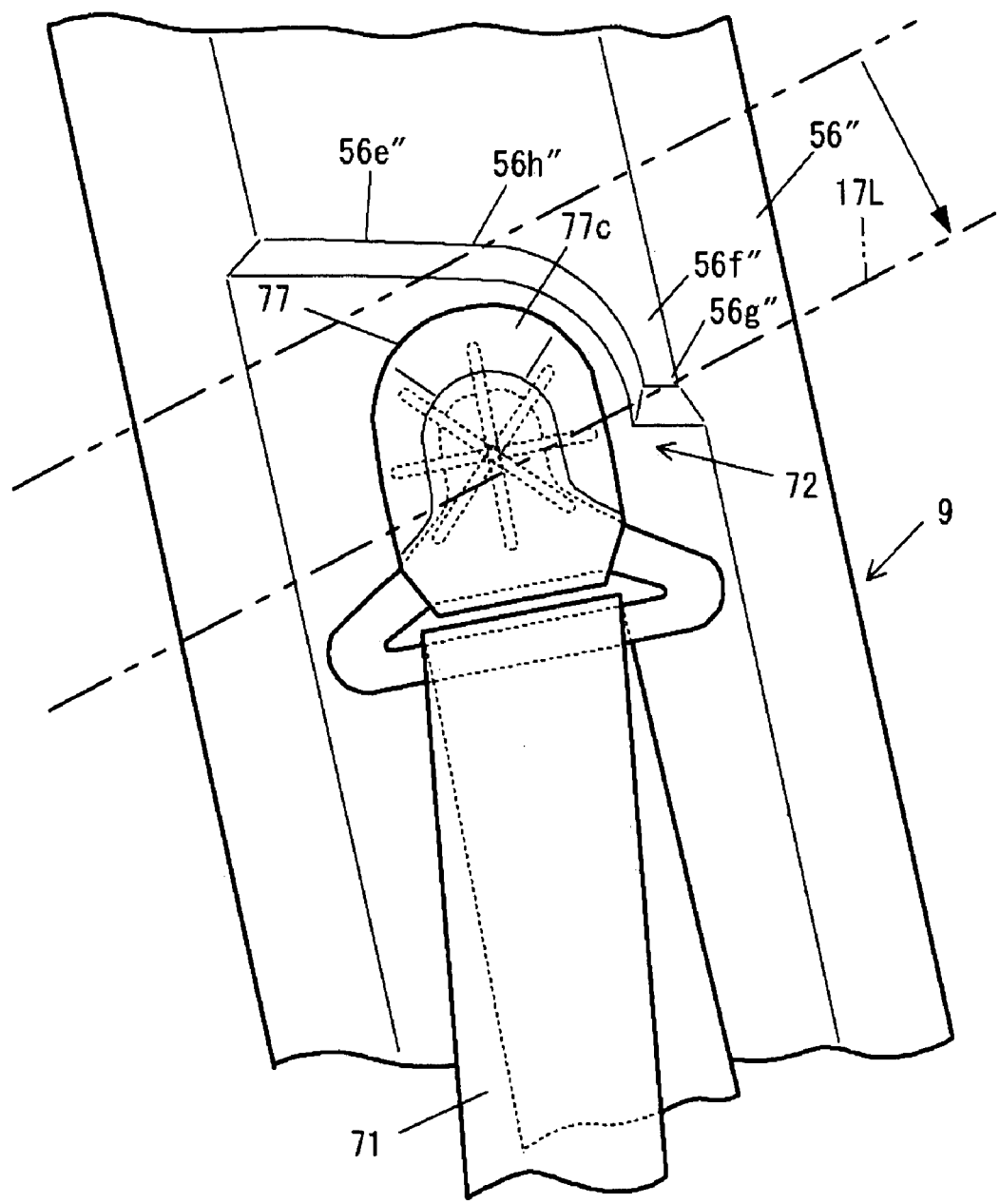
FIG. 19 is a view of a second modification of the uneven portion, corresponding to FIG. 9.

According to another modification, as shown in FIG. 19, its uneven portion 56e" of its C pillar trim 56" of the C pillar 9 has a downward extension portion 56*f*" at its rear portion. A lower end (rear end) 56*g*" of the downward extension portion 56*f*" is located below a portion 56*h*" that is positioned above the seatbelt anchor 72. Thereby, the inflating curtain airbag 17 is configured in such a manner that it can be lifted to the height of the center of the seatbelt anchor 72 by the uneven portion 56*e*", so the curtain airbag 17 can be further surely prevented from catching on the seatbelt anchor 72.

Herein, there is further provided means for facilitating movement of the D pillar trim 26 to allow the curtain airbag 17 to inflate outside. Herein, three specific examples of this means will be descried referring to FIGS. 20-22.

Figure 20:
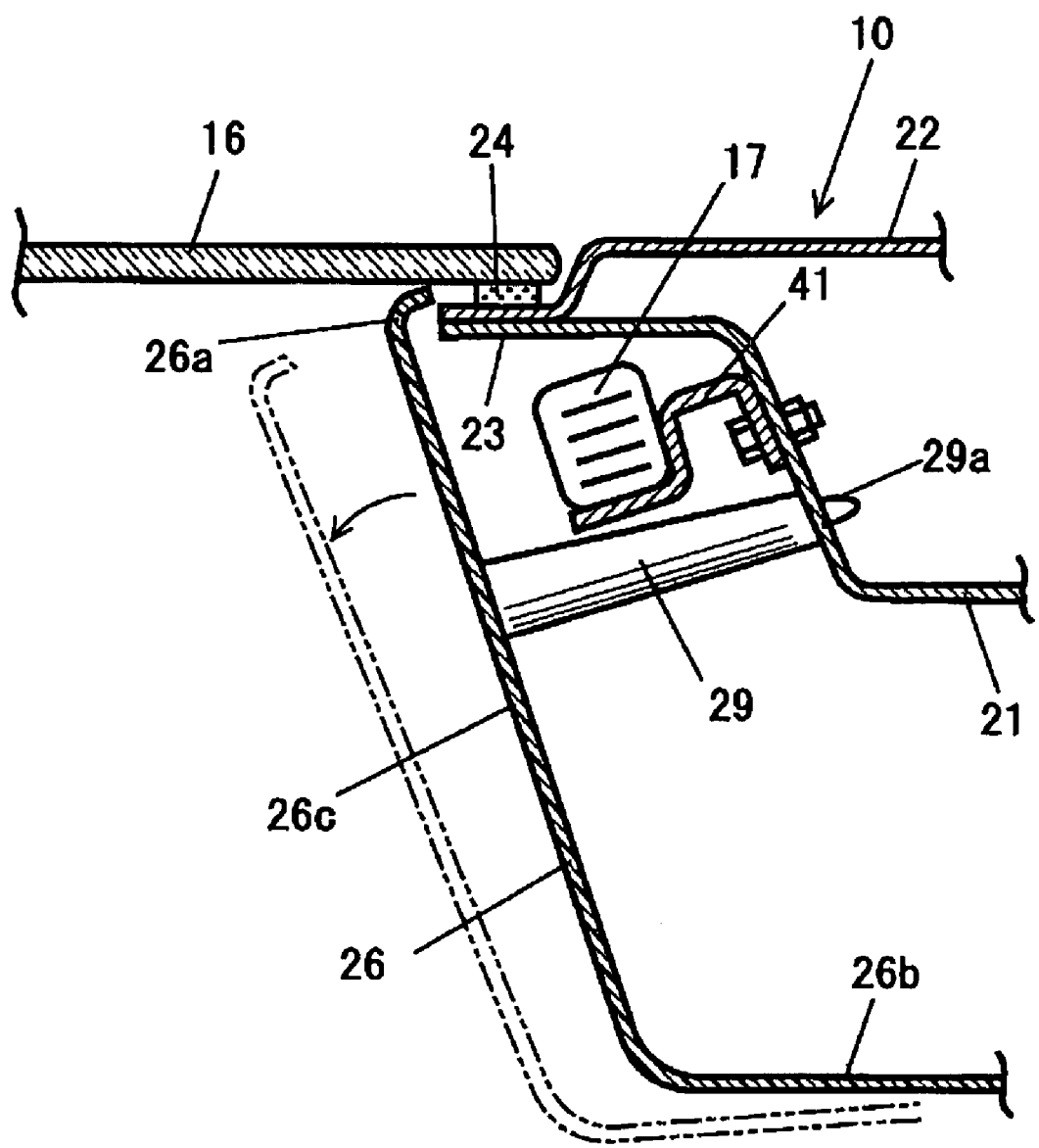
FIG. 20 is a view of a first example of a rear pillar portion, corresponding to FIG. 7.

In a first example shown in FIG. 20, the D pillar trim 26 is configured to be moved forward substantially entirely away from the D pillar 10 when it receives a forward pushing force that is greater than a specified value. Namely, there is provided a support stay 29 so as to project rearward from a back face of the front face portion 26*c* of the trim 26, and an engaging projecting portion 29*a* is formed at its tip end. The engaging projecting portion 29*a* is configured to engage with the D pillar 10. Herein, when the forward pushing force with the specified value or greater acts on the front face portion 26*c*, the engagement of the projecting portion 29*a* with the D pillar 10 is released, so that the D pillar trim 26 is easily moved forward substantially entirely as shown by a one-dotted broken line in FIG. 20. Thereby, the inflation of the curtain airbag 17 can be improved.

Figure 21:
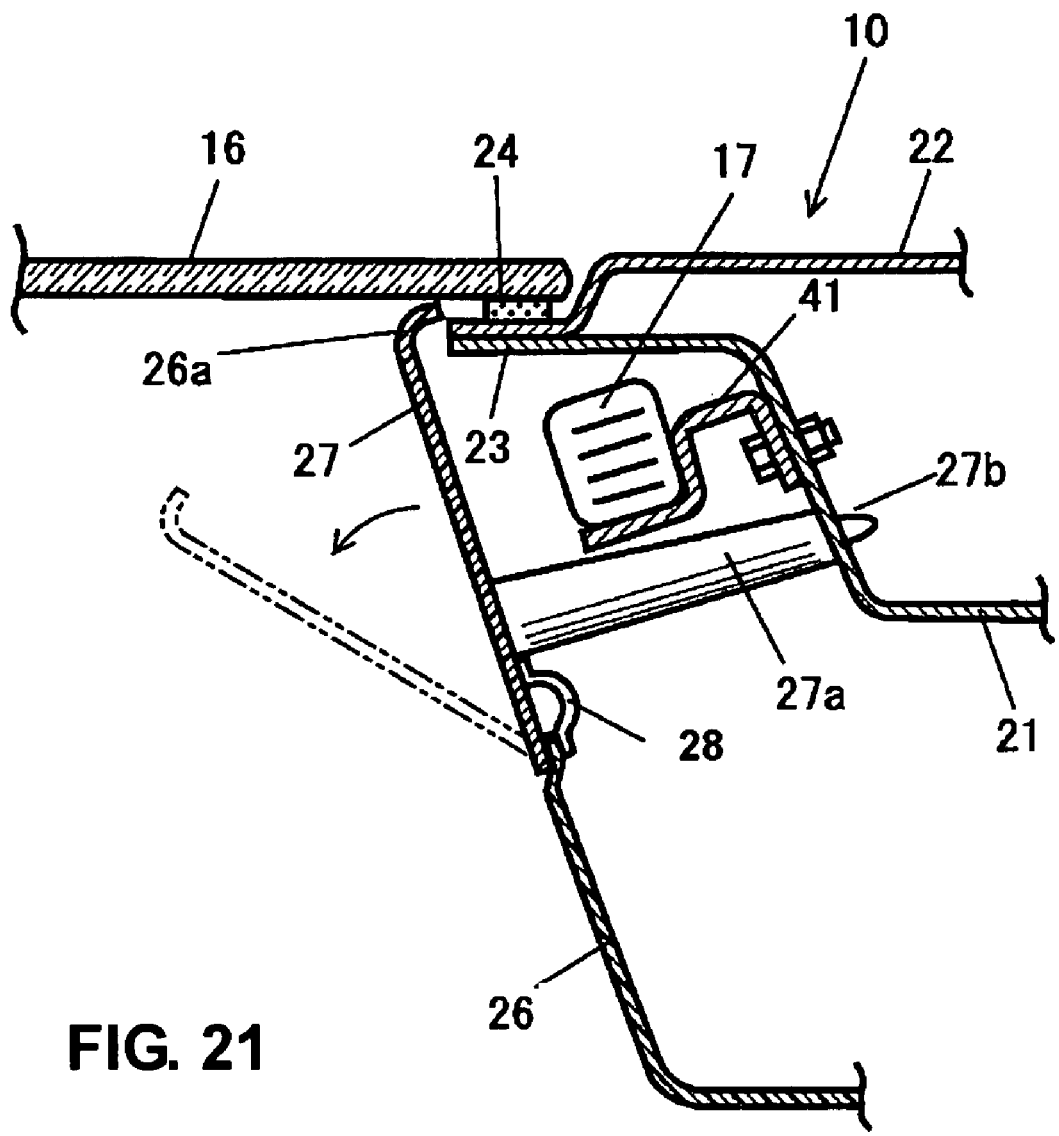
FIG. 21 is a view of a second example of the rear pillar portion, corresponding to FIG. 7.

In a second example shown in FIG. 21, an upper specified portion of the front face portion 26*c* of the D pillar trim 26 is comprised of a separate cover member 27. The cover member 27 is attached to the D pillar trim 26 (trim body) via a hinge 28 in such a manner that their front faces are substantially flat. The hinge 28 is made of a soft material, such as synthetic resin, for example, in a loop shape, so as to make the cover member 27 rotate smoothly around itself. At the cover member 27 is provided a support stay 27 so as to project rearward from a back face of the member 27, and an engaging projecting portion 27*b* is formed at its tip end. The engaging projecting portion 27*b* is configured to engage with the D pillar 10. Accordingly, when the curtain airbag 17 inflates, the engagement of the projecting portion 27*b* with the D pillar 10 is released, so that the cover member 27 is easily rotated forward around the hinge 28 as shown by a one-dotted broken line in FIG. 21. Thereby, the inflation of the curtain airbag 17 can be properly improved. Accordingly, the same effects as that of the first example can be obtained.

Figure 22:
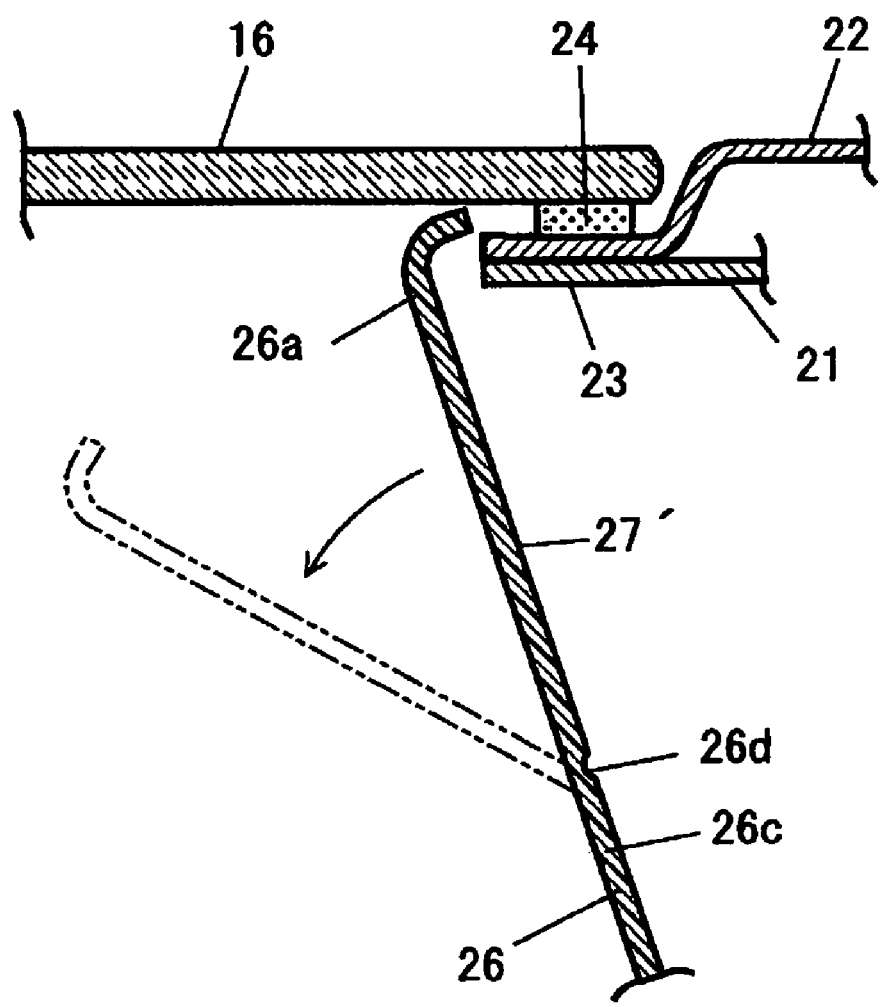
FIG. 22 is a view of a third example of the rear pillar portion, corresponding to FIG. 7.

In a third example shown in FIG. 22, a cover portion 27', which corresponds to the above-described cover member 27, is formed integrally at the front face portion 26*c* of the D pillar trim 26. A groove 26*d* that functions as a hinge mechanism is formed at a back face of the front face portion 26*c* at a border between the cover portion 27' and the other portion. Its closed state at the time the curtain airbag 17 is folded in the stored state is shown by a solid line and its open state at the time of the inflation of the curtain airbag 17 is shown by a one-dotted broken line in FIG. 22. According to the third example, the same effects as that of the first example can be obtained as well.

While the above-described embodiment shows the seatbelt anchor 72 of the seatbelt 71 for the seat 3 that is provided at the C pillar 9, the present invention is applicable to the seatbelt anchor 72 that is provided not at the C pillar 9 itself, but near the C pillar 9. For example, there is provided a bracket at the roof side rail 30R near the C pillar 9 so as to extend to a position near the side window glass 16, and the seatbelt anchor 72 may be attached to this bracket.

Figure 23:
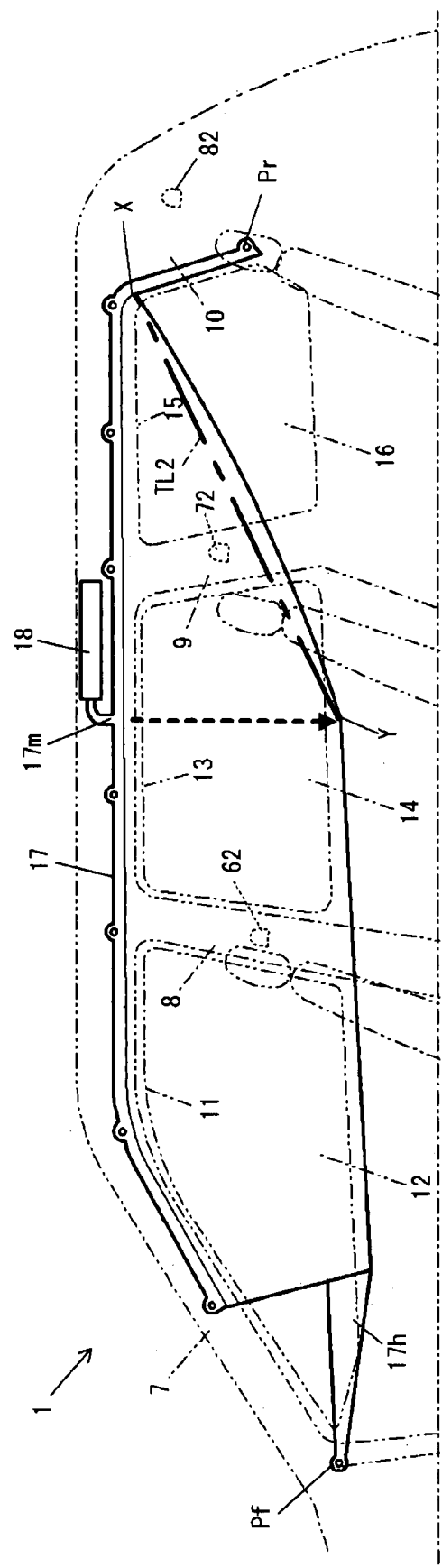
FIG. 23 is a view of the curtain airbag in a specified inflation state, corresponding to FIG. 14 (another example).
Figure 24:
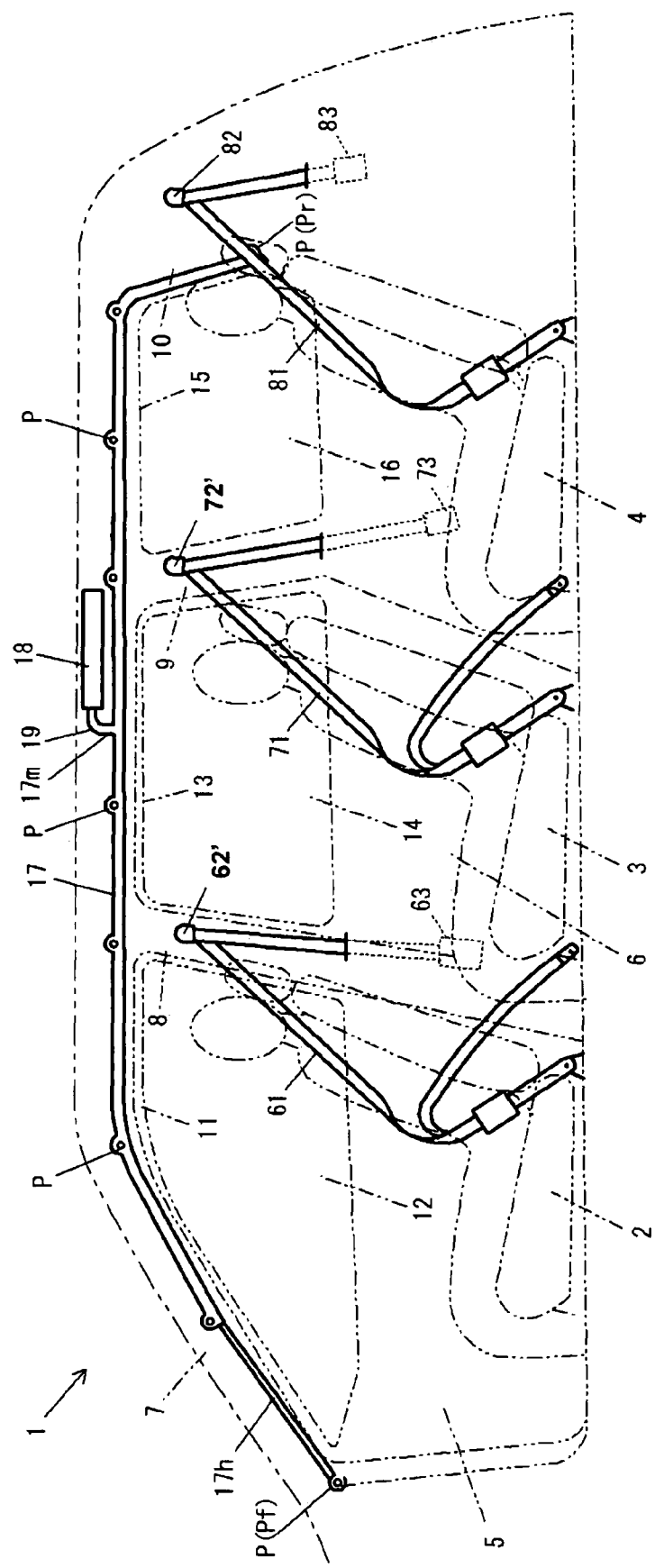
FIG. 24 is a view of a second embodiment, corresponding to FIG. 1.
Figure 25:
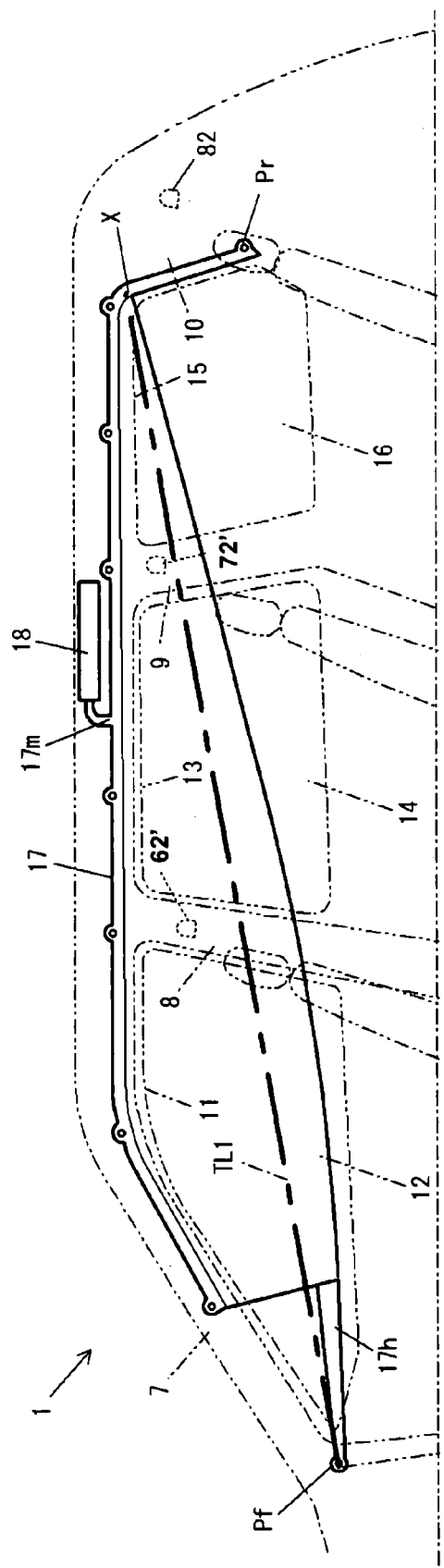
FIG. 25 is a view of the second embodiment, corresponding to FIG. 14.
Figure 26:
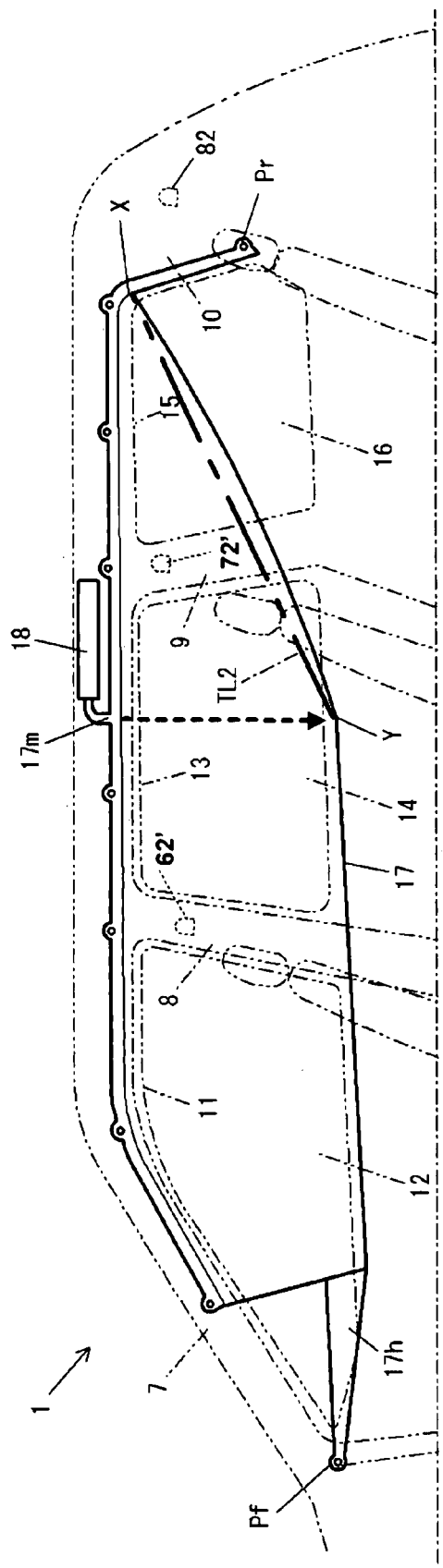
FIG. 26 is a view of the second embodiment, corresponding to FIG. 23.

Further, the above-described embodiment is applicable to a case where a tension line TL2 is provided as shown in FIG. 23. That is, in the case where the inflatable gas is supplied toward the center of the curtain airbag 17 in the longitudinal direction, the gas is forcibly supplied to a lower portion of the lower edge of the airbag 17 that is located below the gas inlet 17*m*, so that the front portion of the airbag 17 inflates greatly as shown in FIG. 23 despite of the rear portion of the airbag with substantially no inflation. In this state, likewise, the curtain airbag 17 provides the tension line TL2 that interconnects a portion Y of the lower edge of the airbag 17 that is located below the gas inlet 17*m* and the front edge portion X of the upper end portion of the rear pillar trim. In this case, while the curtain airbag 17 may contact the C pillar trim 56 at its outside face before the curtain inflates as shown in FIG. 23, its pressing force against the C pillar trim 56 is relatively small compared to the moment the curtain airbag 17 subsequently inflates toward the lower portion of the D pillar trim 26. Therefore, if the seatbelt anchor 72 is provided at a portion of the C pillar trim 56 that is located on or below the tension line TL2, the same problem as the case of tension line TL1 may occur for the further inflation. In this case, however, the above-described effects can be attained as well.

Embodiment 2

The present embodiment will be described referring to FIGS. 24-27. According to the present embodiment, the seatbelt anchors 62', 72' are provided at a higher level position than those in the previous embodiment, respectively. Particularly the seatbelt anchor 72' provided at the C pillar 9 is provided above the tension line TL1 and the tension line TL2. According to the present embodiment, since the tension and the pressing force at the moment the curtain airbag goes over the seatbelt anchor 72' is not so large, the curtain airbag 17 may not catch on the seatbelt anchor 72' and the lower end of the curtain airbag 17 may not get into the above-described gap S. Thereby, the proper inflation of the curtain airbag 17 can be provided. Herein, the portion above the tension line TL1 or the tension line TL2 corresponds to the specified upper portion of the inner face of the center pillar in the claim.

Figure 27:
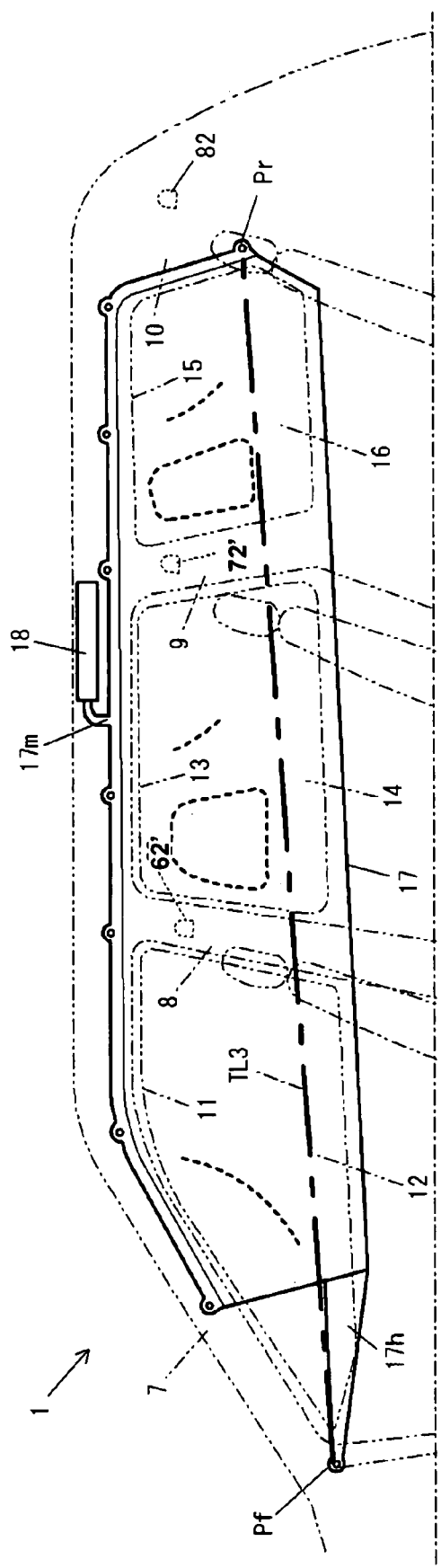
FIG. 27 is a view of the second embodiment, corresponding to FIG. 15.

When the inflation is complete as shown in FIG. 27, the curtain airbag 17 provides the tension line TL3 on the line interconnecting the front fixing point Pf and the rear fixing point Pr, thereby generating a sufficient resistance force against the vehicle turnover or the like.

Herein, the above-described tension lines TL1, TL2, TL3 are just examples for the above-described structure with the curtain airbag, roof trim, D pillar trim, and so on. Accordingly, their incline or height may differ depending on modifications of the structure. However, the present invention is applicable to these modifications. In a case where a plurality of tension lines are provided, the seatbelt anchor can be provided above the tension line that extends across the center pillar at the highest level. In the case where the tension line TL2 and the tension line TL1 are provided, the seatbelt anchor 72' may be provided above the tension line TL2, and the provision of the seatbelt anchor 72' above the tension line TL1 can surely improve the inflation.

The present invention should not be limited to the above-described embodiments (modifications, examples), but any other modifications and improvements may be applied within the scope of a spirit of the present invention.

What is claimed is:

1. An interior structure of a vehicle equipped with a curtain airbag, comprising:
first, second and third row seats disposed in the vehicle from a vehicle front in order,
A, B, C and D pillars disposed from the vehicle front in order, the first row seat being positioned between the A pillar and the B pillar, the second row seat being positioned between the B pillar and the C pillar, the third seat being positioned between the C pillar and the D pillar,
a roof trim forming a ceiling;
a D pillar trim forming an inner face of a said D pillar that is located at a rear portion of the vehicle, the D pillar trim being made of synthetic resin that is harder than a material making the roof trim;
a seatbelt anchor provided at an inner face of said C pillar, the seatbelt anchor projecting inside of the vehicle; and
a curtain airbag provided inside a side edge portion of the roof trim and the D pillar trim along at least from an upper front portion of the C pillar to a lower portion of the D pillar, the curtain airbag being configured to inflate covering at least an inner face of a side window portion of the vehicle that is located in front of a front edge portion of the D pillar including the C pillar, when inflatable gas is supplied thereto through a gas inlet which is located between the B pillar and the C pillar at an upper portion of the vehicle under a specified condition,
wherein said curtain airbag inflates substantially contacting the inner face of the C pillar, and the inflatable gas is supplied forcibly toward a specified portion of a lower edge of the curtain airbag that is located below said gas inlet so that the curtain airbag provides a tension line that interconnects said specified portion of the lower edge of the curtain airbag located below the gas inlet and a front edge portion of an upper end portion of the D pillar trim when the curtain airbag is in its inflated state, and
said seatbelt anchor provided at the C pillar is located above said tension line.

2. The interior structure of a vehicle equipped with a curtain airbag of claim 1, wherein there is provided a slant face at an upper portion of said seatbelt anchor provided at the C pillar, the slant face being formed in such a manner that a lower portion thereof is located inward.

3. The interior structure of a vehicle equipped with a curtain airbag of claim 2, wherein said seatbelt anchor is provided at the inner face of the C pillar so as to rotate around an axis that extends substantially in a vehicle width direction, and said slant face is provided at the upper portion of the seatbelt anchor in such a manner that a clear rearview from a driver's seat is not substantially deteriorated by the seatbelt anchor rotating by a specified rotational angle for application of a seatbelt to a passenger.

4. The interior structure of a vehicle equipped with a curtain airbag of claim 3, wherein said C pillar comprises a C pillar body and a C pillar trim that covers the C pillar body and forms an inner face of the C pillar, the C pillar is formed in such a manner that a central portion thereof projects toward inside of the vehicle, and a gap in a vehicle width direction between an inner face of the C pillar trim and a face of the seatbelt anchor that faces said inner face of the C pillar trim when the seatbelt anchor rotates due to the application of the seatbelt is configured not to become larger than the gap at the time of an non-application of the seatbelt.

5. The interior structure of a vehicle equipped with a curtain airbag of claim 2, wherein said curtain airbag is configured in such a manner that the inflatable gas is supplied thereto from a specified location in front of the C pillar, said seatbelt anchor is configured such that an incline of the upper portion thereof is gentler than that of a front portion thereof, the seatbelt anchor is provided so as to rotate around an axis that extends substantially in a vehicle width direction, and there is provided a seatbelt holding member to hold the seatbelt anchor at a specified rotational position such that a vertical direction of the seatbelt anchor has a specified angle or less relative to an inflation direction of the curtain airbag when the seatbelt is not applied.

6. The interior structure of a vehicle equipped with a curtain airbag of claim 1, wherein said inner face of the C pillar has an uneven portion that is formed near an upper edge portion of said seatbelt anchor so as to overhang in such a manner that an upper overhanging portion is located inward from an outside end portion of the upper edge portion of the seatbelt anchor.

7. The interior structure of a vehicle equipped with a curtain airbag of claim 6, wherein said uneven portion of the C pillar is formed so as to be located at least at a rear part of the C pillar.

8. The interior structure of a vehicle equipped with a curtain airbag of claim 6, wherein said curtain airbag is configured in such a manner that the inflatable gas is supplied thereto from a specified location in front of the C pillar, and at an inner face of said B pillar is provided an interior member to project inward of the vehicle.

9. The interior structure of a vehicle equipped with a curtain airbag of claim 8, wherein said interior member is provided below a line that interconnects an upper end of said D pillar trim and a front-end fixing portion of said curtain airbag and above a line that interconnects a rear end of said uneven portion and the front-end fixing portion of the curtain airbag.

10. The interior structure of a vehicle equipped with a curtain airbag of claim 6, wherein said curtain airbag is configured in such a manner that the inflatable gas is supplied thereto from a specified location in front of the C pillar, and a rear end of said uneven portion is positioned at substantially the same height level as or below a front portion of the uneven portion that is located above the seatbelt anchor.

11. The interior structure of a vehicle equipped with a curtain airbag of claim 1, wherein a front end portion of said curtain airbag is fixed to a vehicle body at a point below the upper end portion of the D pillar trim, and said seatbelt anchor is located above a line that interconnects said fixing point of the airbag to the vehicle body and the upper end portion of the D pillar trim.

12. The interior structure of a vehicle equipped with a curtain airbag of claim 1, wherein there is provided means for facilitating movement of the D pillar trim to allow the curtain airbag to inflate outside.

13. The interior structure of a vehicle equipped with a curtain airbag of claim 1, wherein said curtain airbag is configured to inflate with a first pressing force against a specified upper portion of the inner face of the C pillar when the curtain airbag inflates pressing outward the roof trim in front of an upper end portion of the D pillar trim and inflate with a second pressing force against a portion below said specified upper portion of the inner face of the C pillar when the curtain airbag inflates downward from the upper end portion of the D pillar trim, the second pressing force being greater than the first pressing force, and said seatbelt anchor is located at said specified upper portion of the inner face of the C pillar.

14. The interior structure of a vehicle equipped with a curtain airbag of claim 1, wherein said curtain airbag provides in its fully inflated state a tension line that interconnects a front end portion of the curtain airbag is fixed to a vehicle body and a rear end portion of the curtain airbag is fixed to the vehicle body which is located at the D pillar in-between an upper and lower end of a side window glass.

* * * * *